(12) United States Patent
Wang et al.

(10) Patent No.: US 10,880,330 B2
(45) Date of Patent: Dec. 29, 2020

(54) SYSTEMS AND METHODS FOR DETECTION OF INFECTED WEBSITES

(71) Applicant: Indiana University Research and Technology Corporation, Indianapolis, IN (US)

(72) Inventors: XiaoFeng Wang, Bloomington, IN (US); Kan Yuan, Bloomington, IN (US); Xiaojing Liao, Atlanta, GA (US); Raheem A. Beyah, Atlanta, GA (US)

(73) Assignees: Indiana University Research & Technology Corporation, Indianapolis, IN (US); Georgia Tech Research Corporation, Atlanta, GA (US)

( * ) Notice: Subject to any disclaimer, the term of this patent is extended or adjusted under 35 U.S.C. 154(b) by 135 days.

(21) Appl. No.: 15/983,093

(22) Filed: May 18, 2018

(65) Prior Publication Data
US 2018/0375896 A1  Dec. 27, 2018

Related U.S. Application Data

(60) Provisional application No. 62/508,627, filed on May 19, 2017.

(51) Int. Cl.
*H04L 29/06* (2006.01)
*G06F 16/9535* (2019.01)
(Continued)

(52) U.S. Cl.
CPC ...... *H04L 63/1483* (2013.01); *G06F 16/9535* (2019.01); *G06F 21/566* (2013.01);
(Continued)

(58) Field of Classification Search
CPC ............. H04L 63/1483; H04L 63/1416; G06F 40/205; G06F 40/30; G06F 21/566; G06F 16/9535
See application file for complete search history.

(56) References Cited

U.S. PATENT DOCUMENTS

| | | | |
|---|---|---|---|
| 6,594,691 B1 * | 7/2003 | McCollum | G06Q 30/0251 709/218 |
| 8,695,100 B1 * | 4/2014 | Cosoi | G06F 21/554 713/187 |

(Continued)

OTHER PUBLICATIONS

Jiasi Chen, et al. A Scheduling Framework for Adaptive Video Delivery over Cellular Networks; 12 pages.
(Continued)

*Primary Examiner* — Michael Pyzocha
(74) *Attorney, Agent, or Firm* — Faegre Drinker Biddle & Reath LLP

(57) ABSTRACT

System and method for detecting an infected website are disclosed. A semantic finder receives top-level domains and identifies keywords of the top-level domains representing a predetermined semantics. The keywords are compared with irrelevant bad terms to find at least one irrelevant term. An inconsistency searcher searches the top-level domains and detects at least one fully-qualified domain name carrying the at least one irrelevant term. A context analyzer evaluates context information associated with the irrelevant term, identifies at least one frequently-used term identified in the context information, and determines whether the at least one frequently-used term is unrelated to a generic content of the at least one fully-qualified domain name An irrelevant bad term collector extracts the at least one frequently-used term unrelated to the generic content and adds the extracted frequently-used term to an irrelevant bad term list for detecting the infected website.

20 Claims, 8 Drawing Sheets

(51) Int. Cl.
*G06F 21/56* (2013.01)
*G06F 40/30* (2020.01)
*G06F 40/205* (2020.01)

(52) U.S. Cl.
CPC ............ *G06F 40/205* (2020.01); *G06F 40/30* (2020.01); *H04L 63/1416* (2013.01)

(56) References Cited

U.S. PATENT DOCUMENTS

| | | | |
|---|---|---|---|
| 2003/0120947 A1* | 6/2003 | Moore | G06F 21/563 726/22 |
| 2006/0080735 A1* | 4/2006 | Brinson | G06F 21/554 726/22 |
| 2010/0106671 A1* | 4/2010 | Li | G06N 5/04 706/46 |
| 2010/0186088 A1* | 7/2010 | Banerjee | G06F 21/51 726/23 |
| 2011/0295790 A1* | 12/2011 | Zillner | G06N 5/02 706/55 |
| 2012/0304287 A1* | 11/2012 | Yu | G06F 21/56 726/22 |
| 2013/0110802 A1* | 5/2013 | Shenoy | G06F 16/955 707/706 |
| 2015/0295942 A1* | 10/2015 | Tao | H04L 63/1483 726/23 |
| 2016/0241589 A1* | 8/2016 | Liu | H04L 63/168 |
| 2016/0285894 A1* | 9/2016 | Nelms | H04L 63/1416 |
| 2016/0294862 A1* | 10/2016 | Tao | H04L 67/02 |
| 2016/0306974 A1* | 10/2016 | Turgeman | G06Q 20/4016 |
| 2016/0344770 A1* | 11/2016 | Verma | G06N 20/00 |
| 2018/0052937 A1* | 2/2018 | Mohan | G06F 16/9535 |
| 2018/0069883 A1* | 3/2018 | Meshi | H04L 63/1425 |
| 2018/0248898 A1* | 8/2018 | Liu | G06F 21/56 |

OTHER PUBLICATIONS

Manage, transform, and deliver media content with cloud-based workflows, Azure Media Services, http://www.iis.net/downloads/microsoft/smooth-streaming; 10 pages.
Marta Carbone, Luigi Rizzo, Public Review for Dummynet Revisited, ACM SIGCOMM Computer Communication Review; 9 pages.
Xiaoqi Yin, et al., A Control-Theoretic Approach for Dynamic Adaptive Video Streaming Over HTTP, SIGCOMM '15, Aug. 17-21, 2015; 14 pages.
Xuan Kelvin Zou, Can Accurate Predictions Improve Video Streaming in Cellular Networks?; 6 pages.
GPAC Multimedia Open Source Project, https://gpac.wp.mines-telecom.fr.
Aruna Balasubramanian, et al., Augmenting Mobile 3G Using WiFi; 13 pages.
Suibin Tian, et al., Towards Agile and Smooth Video Adaptation in Dynamic HTTP Streaming; 12 pages.
Cisco Annual Internet Report (2018-2023) White Paper; 39 pages.
Jiyan Wu, et al, Streaming High-Quality Mobile Video with Multipath TCP in Heterogeneous Wireless Networks, IEEE Transactions on Mobile Computing, vol. 15, No. 9, Sep. 2016; 17 pages.
Balajee Vamanan, et al. Deadline-Aware Datacenter TCP (D2TCP); 12 pages.
Xiufeng Xia, et al., piStream: Physical Layer Informed Adaptive Video Streaming Over LTE; 13 pages.
Damon Wischik, et al., Design, implementation and evaluation of congestion control for multipath TCP; 14 pages.
Joel Sommers, Paul Barford, Cell vs. WiFi: On the Performance of Metro Area Mobile Connections; 14 pages.
Feng Qian, et al., Optimizing 360 Video Delivery Over Cellular Networks; 6 pages.
Feng Qian, et al., Profiling Resource Usage for Mobile Applications: A Cross-Layer Approach; 14 pages.
Anthony Vetro, The MPEG-DASH Standard for Multimedia Streaming Over the Internet, Industry and Standards; 6 pages.
MultiPath TCP-Linux Kernel implementation, http://www.multipath-tcp.org; 4 pages.
Philipp S. Schmidt, et al, Socket Intents: Leveraging Application Awareness for Multi-Access Connectivity; 6 pages.
Kyunghan Lee, et al., Mobile Data Offloading: How Much Can WiFi Deliver?, IEEE/ACM Transactions on Networking, vol. 21, No. 2, Apr. 2013; 16 pages.
Stefan Lederer, Christopher Muller, Christian Timmerer, Dynamic Adaptive Streaming Over HTTP Dataset; 6 pages.
HTTP Live Streaming; Apple, Inc., 2020; 3 pages.
Catalin Nicutar, et al., Using Cooperation for Low Power Low Latency Cellular Connectivity; 12 pages.
Yeon-sup Lim, et al., Design, Implementation, and Evaluation of Energy-Aware Multi-Path TCP; 13 pages.
Ana Nika, et al., Energy and Performance of Smartphone Radio Bundling in Outdoor Environments; 11 pages.
Te-Yuan Huang, et al., Confused, Timid, and Unstable: Picking a Video Streaming Rate is Hard; 14 pages.
Junchen Jiang, Vyas Sekar, Hui Zhang, Improving Fairness, Efficiency, and Stability in HTTP-based Adaptive Video Streaming with FESTIVE; 12 pages.
B. Hesmans, G. Detal, S. Barre, R. Bauduin, O. Bonaventure, SMAPP: Towards Smart Multipath TCP-enabled APPlications; 7 pages.
Srikanth Kandula Mit, et al., FatVAP: Aggregating AP Backhaul Capacity to Maximize Throughput; 15 pages.
Te-Yuan Huang, et al., A Buffer-Based Approach to Rate Adaptation: Evidence from a Large Video Streaming Service; 12 pages.
Junxian Huang, et al., A Close Examination of Performance and Power Characteristics of 4G LTE Networks; 14 pages.
High-quality, network-efficient HTTP streaming; 3 pages.
Bo Han, et al., Mobile Data Offloading through Opportunistic Communications and Social Participation, IEEE Transactions on Mobile Computing, vol. 11, No. 5, May 2012; 14 pages.
Bo Han, Feng Qian, Shuai Hao, Lusheng Ji, an Anatomy of Mobile Web Performance over Multipath TCP, 2015 ACM; 1 pages.
TCP Extensions for Multipath Operation with Multiple Addresses; 79 pages.
Qi He, Constantine Dovrolis, Mostafa Ammar, on the Predictability of Large Transfer TCP Throughput; 12 pages.
TCP Extensions for Multipath Operation with Multiple Addresses, Multipath TCP, Sep. 2019; 79 pages.
Andrei Croitoru, et al., Towards Wifi Mobility without Fast Handover, Usenix, The Advanced Computing Systems Association; 17 pages.
Yung-Chih Chen, et al., A Measurement-based Study of MultiPath TCP Performance over Wireless Networks; 14 pages.
Shuo Deng, et al., WiFi, LTE, or Both? Measuring Multi-Homed Wireless Internet Performance; 14 pages.
Aditya Dua, et al., Channel, Deadline, and Distortion (CD2) Aware Scheduling for Video Streams over Wireless, IEEE Transactions on Wireless Communications, vol. 9, No. 3, Mar. 2010; 11 pages.
About Hotel WiFi test, https://www.hotelwifitest.com/about/; 2 pages.
Xavier Corbillon, et al., Cross-Layer Scheduler for Video Streaming over MPTCP; 12 pages.

\* cited by examiner

Brand Viagra 100Mg - Stanford University → title
stanford.edu/group/outdoors/.../brand-viagra-100mg/ ▼ Stanford University → URL
Buy Cheap brand viagra 100mg Now Cheap Online Pharmacy. WorldWide Shipping → snippet Buy Cheap cialis for sale canada Now Top Online ...
stanford.edu/group/outdoors/.../cialis-for-sale-canada... ▼ Stanford University
Buy Cheap cialis for sale canada Now Top Online Pharmacy. WorldWide Shipping.

Buy Cheap tadalafil maximum dose Now Top Online ...
stanford.edu/group/.../cgi.../tadalafil-maximum-dose/ ▼ Stanford University
Buy Cheap tadalafil maximum dose Now Top Online Pharmacy Supplier. Best Prices.

Alternative To Viagra Drugs - Stanford University
stanford.edu/group/.../alternative-to-viagra-drugs/ ▼ Stanford University
Buy Cheap alternative to viagra drugs Online Cheap Pharmacy Online. Best Drugstore.

FIG. 1

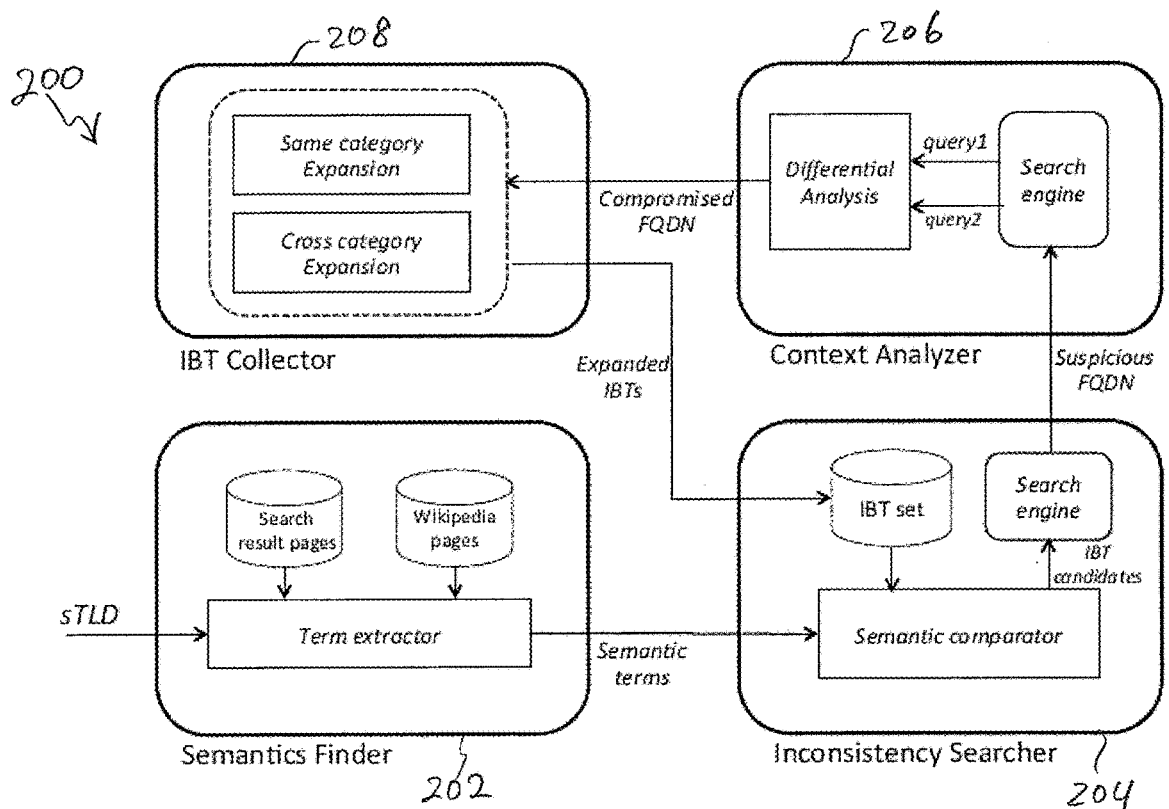

FIG. 2

Query — site:mysau3.arbor.edu "casino"

```
"url":"https://mysau3.arbor.edu/ICS/Portlets/ICS/bookmarkportlet/
viewhandler.ashx?id=913a2a91-8cd9-491a-aaae-7d4837b93fc0",
"title":"Online Casino by DewaCasino.com: Live Casino Online ...",
"snippet":"DewaCasino is a promoter casino best online with live
dealers reliable. Fair and is one of the largest in Asia today. Join!"
```

```
"url":"https://mysau3.arbor.edu/ICS/Portlets/ICS/bookmarkportlet/
viewhandler.ashx?
Id=0d616a77-0d7b-4297-8350-4730797b5153",
"title":"iGamble247.com :: Live Casino Online - Casino Agent",
"snippet":"Igamble247 is a promoter casino best online with live
dealers reliable. Fair and is one of the largest in Asia today. Join!"
```

⇒

(
bookmarkportlet:10, viewhandler:10,
online:8, promoter:6, dealers:6,
gambling:5, slot:5, roulette: 5,
...
ics:0, student:0, university:0,
graduate:0, alumni:0, department:0,
association:0, credit:0, center:0,
...
)

Query — site:mysau3.arbor.edu

```
"url":"https://mysau3.arbor.edu/ics/Students/",
"title":"Students - MySAU - Spring Arbor University",
"snippet":"To print a certificate (proof) of enrollment or order a
transcript, go to the National Student Clearinghouse site."
```

```
"url":"https://mysau3.arbor.edu/ICS/Alumni/About_the_Association/
Default_Page.jnz",
"title":"Default Page - MySAU - Spring Arbor University",
"snippet":"The Spring Arbor University Alumni Association exists to
serve the University and its graduates by providing alumni with a
continuing link among themselves and..."
```

⇒

(
bookmarkportlet:0, viewhandler:0,
online:0, promoter:0, dealers:0,
gambling:0, slot:0, roulette: 0,
...
ics:4, student:3, university:3,
graduate:3, alumni:2, department:2,
association:2, credit:2, center: 2,
...
)

(a) Differential analysis of an injected site. Cosine distance = 0.97

FIG. 3A

Query — site:www.unlv.edu "casino"

```
"url":"https://www.unlv.edu/igi/online-courses",
"title":"Online Courses | International Gaming Institute | University
of ...",
"snippet":"New online casino management classes are currently
being developed by the Center for Professional & Leadership
Studies at UNLV (PLuS Center). Please visit ..."
```

```
"url":"https://www.unlv.edu/igi/casino-marketing",
"title":"Casino Marketing for Industry Professionals | International
...",
"snippet":"Accreditation. You can earn Continuing Education Units
(CEUs) upon successful completion of any of our online casino
management courses. Please contact ..."
```

⇒

(
class:4, education:3, course:3,
management:3, center:2,
professional:2, unit:2, university: 2,
...
snack:0, amenity:0,
...
)

Query — site:www.unlv.edu

```
"url":"https://www.unlv.edu/socialwork",
"title":"School of Social Work | University of Nevada, Las Vegas",
"snippet":"Behavioral Health Workforce Education and Training
Program for Professionals. The UNLV School of Social Work,
Masters Program has been awarded the..."
```

```
"url":"https://www.unlv.edu/studentunion",
"title":"Student Union | University of Nevada, Las Vegas",
"snippet":"Welcome. The Student Union offers conveniences and
amenities for everyone, whether you need to grab a snack, hold a
meeting, or just have some fun."
```

⇒

(
PLus:0,
...
education:4, program:3, university:3,
student:3, course:2, school:2,
training:2, center: 2, social:2,
...
)

(b) Differential analysis of a non-injected site. Cosine distance = 0.14

FIG. 3B

FIG. 5A (A) False detection rate in different semantics distances. Color bar shows the coverage rate.

FIG. 5B (B) False positive rate in different semantics distances. Color bar shows the coverage rate.

(A) Cumulative distribution of Alexa global ranks per sites in 3 campaigns.

(B) Cumulative distribution of Alexa bounce rate per sites in 3 campaigns.

(C) Distribution of the infection time for the injected pages in sTLD sites and gTLD sites.

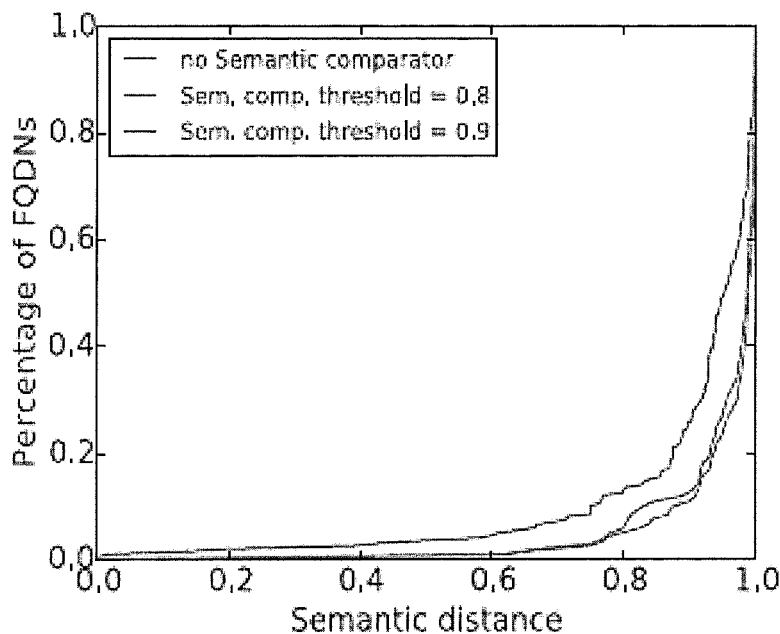

(D) Cumulative distribution of semantics distance per monitored sites.

FIG. 9D

10 Minute Payday Loan - Ice River Springs
iceriversprings.com/wp-page.php?t=10-minute-payday-loan ▼
★ ★ ★ ★ ★  Rating: 9/10 - 690 votes
You are looking for 10 Minute Payday Loan? The application only takes 2 minutes to fill out, is secured with top-notch security software, and is free for you to fill ...

$1000 Payday Loan Florida - Ice River Springs
iceriversprings.com/wp-page.php?t=$1000-payday-loan-florida ▼
★ ★ ★ ★ ★  Rating: 9/10 - 248 votes
You are looking for $1000 Payday Loan Florida? The application only takes 2 minutes to fill out, is secured with top-notch security software, and is free for you to ...

Check My Payday Loan - Ice River Springs
iceriversprings.com/wp-page.php?t=check-my-payday-loan ▼
★ ★ ★ ★ ★  Rating: 9/10 - 182 votes
You are looking for Check My Payday Loan? The application only takes 2 minutes to fill out, is secured with top-notch security software, and is free for you to fill ...

FIG. 10

SYSTEMS AND METHODS FOR DETECTION OF INFECTED WEBSITES

RELATED APPLICATIONS

The present disclosure is related to and claims priority to U.S. Provisional Application No. 62/508,627, entitled "SYSTEMS AND METHODS FOR DETECTION OF INFECTED WEBSITES," filed on May 19, 2017, the entire disclosure of which is hereby expressly incorporated herein by reference.

This invention was made with government support under CNS1223477 awarded by the National Science Foundation. The government has certain rights in the invention.

FIELD OF THE DISCLOSURE

The present disclosure generally relates to website detection systems and methods. More particularly, the present disclosure relates to systems and methods for detecting infected websites.

BACKGROUND OF THE DISCLOSURE

Promotional infection is an attack in which the adversary exploits a website's weakness to inject illicit advertising content. Detection of such an infection is challenging due to its similarity to legitimate advertising activities. More specifically, the promotional infection is an attack exploiting the weakness of a website to promote content. It has been used to serve various malicious online activities (e.g., black-hat search engine optimization (SEO), site defacement, fake antivirus (AV) promotion, Phishing) through various exploit channels (e.g., SQL injection, URL redirection attack and blog/forum Spam). Unlike the attacks hiding malicious payloads (e.g., malware) from the search engine crawler, such as a drive-by download campaign, the promotional attacks never shy away from search engines. Instead, their purpose sometimes is to leverage the compromised domain's reputation to boost the rank of the promoted content (either what is directly displayed under the domain or the doorway page pointed by the domain) in the search results returned to the user when content-related terms are included in her query. Such infections can inflict significant harm on the compromised websites through loss in reputation, search engine penalty, traffic hijacking and may even have legal ramifications. They are also pervasive: as an example, a study shows that over 80% doorway pages involved in black-hat SEO are from injected domains.

As such, there are opportunities to develop an improved website detection system and method that can enhance the detection of infected websites.

SUMMARY

An interesting observation we make in our research is that such an attack almost always incurs a great semantic gap between the infected domain (e.g., a university site) and the content it promotes (e.g., selling cheap viagra). Exploiting this gap, we developed a semantic-based technique, called Semantic Inconsistency Search (SEISE), for efficient and accurate detection of the promotional injections on sponsored top-level domains (sTLD) with explicit semantic meanings. Our approach utilizes Natural Language Processing (NLP) to identify the bad terms (those related to illicit activities like fake drug selling, etc.) most irrelevant to an sTLD's semantics. These terms, which we call irrelevant bad terms (IBTs), are used to query search engines under the sTLD for suspicious domains. Through a semantic analysis on the results page returned by the search engines, SEISE is able to detect those truly infected sites and automatically collect new IBTs from the titles/URLs/snippets of their search result items for finding new infections. Running on 403 sTLDs with an initial 30 seed IBTs, SEISE analyzed 100K fully qualified domain names (FQDN), and along the way automatically gathered nearly 600 IBTs.

In the end, our approach detected 11K infected FQDN with a false detection rate of 1.5% and over 90% coverage. Our study shows that by effective detection of infected sTLDs, the bar to promotion infections can be substantially raised, since other non-sTLD vulnerable domains typically have much lower Alexa ranks and are therefore much less attractive for underground advertising. Our findings further bring to light the stunning impacts of such promotional attacks, which compromise FQDNs under 3% of .edu, .gov domains and over one thousand gov.cn domains, including those of leading universities such as stanford.edu, mit.edu, princeton.edu, havard.edu and government institutes such as nsf.gov and nih.gov. We further demonstrate the potential to extend our current technique to protect generic domains such as .com and .org.

In one embodiment of the present disclosure, a system is disclosed having at least one processor configured to execute at least one computer-executable instruction for detecting an infected website. The system includes a semantic finder configured to receive a set of top-level domains and identify a plurality of keywords of the set of top-level domains representing a predetermined semantics. The plurality of keywords representing the predetermined semantics is compared with a seed set of irrelevant bad terms to find at least one irrelevant term. Also included in the system is an inconsistency searcher configured to search the set of top-level domains and detect at least one fully-qualified domain name carrying the at least one irrelevant term. Further, a context analyzer is configured to evaluate context information associated with the at least one irrelevant term, identify at least one frequently-used term identified in the context information, and determine whether the at least one frequently-used term is unrelated to a generic content of the at least one fully-qualified domain name. Also, an irrelevant bad term collector is configured to extract the at least one frequently-used term unrelated to the generic content and add the extracted at least one frequently-used term to an irrelevant bad term list for detecting the infected website.

In one example, the semantic finder is further configured to calculate a semantic distance between the plurality of keywords of the set of top-level domains and the seed set of irrelevant bad terms. In a variation, the sematic finder is further configured to calculate the semantic distance based on a cosine distance between the plurality of keywords of the set of top-level domains and the seed set of irrelevant bad terms. In another variation, the inconsistency searcher is further configured to detect the at least one fully-qualified domain name carrying the at least one irrelevant term based on the semantic distance.

In another example, the context analyzer is further configured to convert the context information into a dimensional vector having a frequency of each keyword of the plurality of keywords representing the predetermined semantics.

In yet another example, the context analyzer is further configured to evaluate the context information associated with the at least one irrelevant term using a differential analysis.

In still another example, the context analyzer is further configured to determine whether the context information is compatible with a theme of the at least one fully-qualified domain name based on a semantic distance between the plurality of keywords of the set of top-level domains and the seed set of irrelevant bad terms.

In yet still another example, the irrelevant bad term collector is further configured to detect the infected website based on the irrelevant bad term list.

In a further variation, the irrelevant bad term collector is further configured to detect an additional infected website based on an URL pattern of the infected website.

In another further variation, the irrelevant bad term collector is further configured to add the extracted at least one frequently-used term having a largest semantic distance from the set of top-level domains to the irrelevant bad term list.

In another embodiment of the present disclosure, a method of detecting an infected website is disclosed using at least one processor configured to execute at least one computer-executable instruction. The method includes receiving, using a semantic finder, a set of top-level domains and identifying a plurality of keywords of the set of top-level domains representing a predetermined semantics, the plurality of keywords representing the predetermined semantics being compared with a seed set of irrelevant bad terms to find at least one irrelevant term. The method further includes searching, using an inconsistency searcher, the set of top-level domains and detecting at least one fully-qualified domain name carrying the at least one irrelevant term; evaluating, using a context analyzer, context information associated with the at least one irrelevant term, identifying at least one frequently-used term identified in the context information, and determining whether the at least one frequently-used term is unrelated to a generic content of the at least one fully-qualified domain name; and extracting, using an irrelevant bad term collector, the at least one frequently-used term unrelated to the generic content and add the extracted at least one frequently-used term to an irrelevant bad term list for detecting the infected website.

In one example, the method further includes calculating, using the semantic finder, a semantic distance between the plurality of keywords of the set of top-level domains and the seed set of irrelevant bad terms. In a variation, the method further includes calculating, using the sematic finder, the semantic distance based on a cosine distance between the plurality of keywords of the set of top-level domains and the seed set of irrelevant bad terms. In another variation, the method further includes detecting, using the inconsistency searcher, the at least one fully-qualified domain name carrying the at least one irrelevant term based on the semantic distance.

In another example, the method further includes converting, using the context analyzer, the context information into a dimensional vector having a frequency of each keyword of the plurality of keywords representing the predetermined semantics.

In yet another example, the method further includes evaluating, using the context analyzer, the context information associated with the at least one irrelevant term using a differential analysis.

In still another example, the method further includes determining, using the context analyzer, whether the context information is compatible with a theme of the at least one fully-qualified domain name based on a semantic distance between the plurality of keywords of the set of top-level domains and the seed set of irrelevant bad terms.

In yet still another example, the method further includes detecting, using the irrelevant bad term collector, the infected website based on the irrelevant bad term list.

In a further variation, the method further includes detecting, using the irrelevant bad term collector, an additional infected website based on an URL pattern of the infected website.

In another further variation, the method further includes adding, using the irrelevant bad term collector, the extracted at least one frequently-used term having a largest semantic distance from the set of top-level domains to the irrelevant bad term list.

Additional features and advantages of the present disclosure will become apparent to those skilled in the art upon consideration of the following detailed description of the illustrative embodiment exemplifying the best mode of carrying out the invention as presently perceived.

BRIEF DESCRIPTION OF THE DRAWINGS

The embodiments will be more readily understood in view of the following description when accompanied by the below figures and wherein like reference numerals represent like elements, wherein:

FIG. 1 illustrates an exemplary visualization of search findings of promotional injections in stanford.edu, where the search engine result is organized as title, URL and snippet;

FIG. 2 is a schematic block diagram of an exemplary overview of the SEISE infrastructure;

FIGS. 3A-3B illustrate an exemplary visualization of differential analysis of an injected site and a non-injected site;

FIGS. 9A-9D illustrate exemplary graphical representations of Alexa global rank, PR and life span of sites in three campaigns, and cumulative distribution of semantics distance per monitored sites; and FIG. 10 is an exemplary visualization of search engine results of an injected gTLD site.

Figure 4:
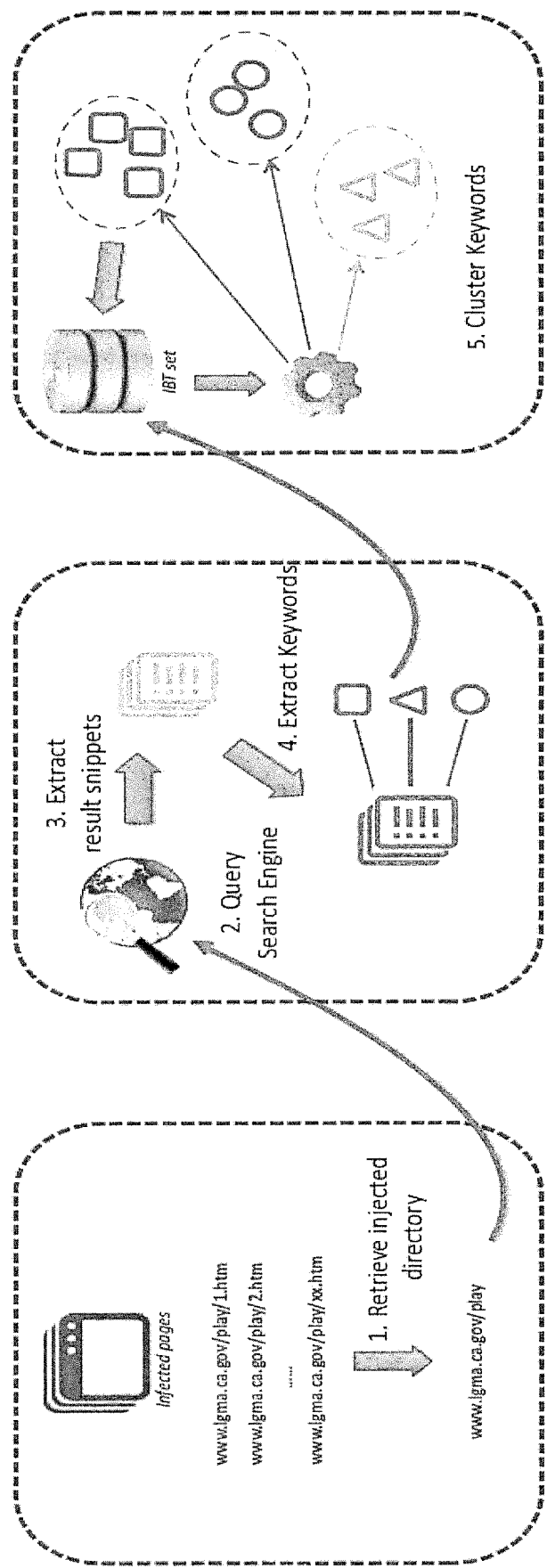
FIG. 4 is a schematic block diagram of an exemplary IBT set extension.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate an exemplary embodiment of the disclosure, in one form, and such exemplifications are not to be construed as limiting the scope of the disclosure in any manner

DETAILED DESCRIPTION OF EMBODIMENTS

Embodiments of the present disclosure are described below by way of example only, with reference to the accompanying drawings. Further, the following description is merely exemplary in nature and is in no way intended to limit the disclosure, its application, or uses. As used herein, the term "module" or "unit" may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

Introduction

FIG. 1 shows an exemplary search engine result under the domain of Stanford University. Advertisements (ad) show selling cheap viagra! Using various search terms, we also found the ads for prescription-free viagra and other drugs under nidcr.nih.gov (National Institute of Dental and Craniofacial Research), counterfeit luxury handbag under dap.dau.mil (Defense Acquisition Portal), and replica Rolex under nv.gov, the domain of the Nevada state government. Clearly, all those FQDNs have been unauthorized changes for promoting counterfeit or illicit products. This type of attacks (exploiting a legitimate domain for underground advertising) is called promotional infection in our research.

Promotional infection is an attack exploiting the weakness of a website to promote content. It has been used to serve various malicious online activities (e.g., black-hat search engine optimization (SEO), site defacement, fake antivirus (AV) promotion, Phishing) through various exploit channels (e.g., SQL injection, URL redirection attack and blog/forum Spam). Unlike the attacks hiding malicious payloads (e.g., malware) from the search engine crawler, such as a drive-by download campaign, the promotional attacks never shy away from search engines. Instead, their purpose sometimes is to leverage the compromised domain's reputation to boost the rank of the promoted content (either what is directly displayed under the domain or the doorway page pointed by the domain) in the search results returned to the user when content-related terms are included in her query. Such infections can inflict significant harm on the compromised websites through loss in reputation, search engine penalty, traffic hijacking and may even have legal ramifications. They are also pervasive: as an example, a study shows that over 80% doorway pages involved in black-hat SEO are from injected domains.

Catching Promotional Infections: Challenges.

Even with the prevalence of the promotional infections, they are surprisingly elusive and difficult to catch. Those attacks often do not cause automatic download of malware and therefore may not be detected by virus scanners like VirusTotal and Microsoft Forefront. Even the content injected into a compromised website can appear perfectly normal, no difference from the legitimate ads promoting similar products (e.g., drugs, red wine, etc.), ideological and religious messages (e.g., cult theory promotion) and others, unless its semantics has been carefully examined under the context of the compromised site (e.g., selling red wine is unusual on a government's website). So far, detection of the promotional infections mostly relies on the community effort, based upon the discoveries made by human visitors (e.g., PhishTank) or the integrity checks that a compromised website's owner performs. Although attempts have been made to detect such attacks automatically, e.g., through a long term monitoring of changes in a website's DOM structure to identify anomalies or through computer vision techniques to recognize a web page's visual change, existing approaches are often inefficient (requiring long term monitoring or analyzing the website's visual effects) and less effective, due to the complexity of the infections, which, for example, can introduce a redirection URL indistinguishable from a legitimate link or make injected content only visible to the search engine.

Semantic Inconsistency Search.

As mentioned earlier, fundamentally, promotional infections can only be captured by analyzing the semantic meaning of web content and the context in which they appear. To meet the demand for a large-scale online scan, such a semantic analysis should also be fully automated and highly efficient. Techniques of this type, however, have never been studied before, possibly due to the concern that a semantic-based approach tends to be complicated and less accurate. In this paper, we report a design that makes a big step forward on this direction, demonstrating it completely possible to incorporate Natural Language Processing (NLP) techniques into a lightweight security analysis for efficient and accurate detection of promotional infections. A key observation here is that for the attacks in FIG. 1, inappropriate content shows up in the domains with specific meanings: no one expects that a .gov or .edu site promotes prohibited drugs, counterfeit luxury handbags, replica watches, etc. Such inconsistency can be immediately identified and located from the itemized search result on a returned search result page, which includes the title, URL and snippet for each result (as marked out in FIG. 1). This approach, which detects a compromised domain (e.g., stanford.edu) based upon the inconsistency between the domain's semantics and the content of its result snippet reported by a search engine with regard to some search terms, is called semantic inconsistency search or simply SEISE. Our current design of SEISE focuses on sponsored top-level domain (sTLD) like .gov, .edu, .mil, etc., that has a sponsor (e.g., US General Service Administration, EDUCAUSE, DoD Network Information Center), represents a narrow community and carries designated semantics (Section III-A). Later we show that the technique has the potential to be extended to generic TLD (gTLD, see Section V-B).

SEISE is designed to search for a set of strategically selected irrelevant terms under an sTLD (e.g., .edu) to find out the suspicious FQDNs (e.g., stanford.edu) associated with the terms, and then further search under the domains and inspect the snippets of the results before flagging them as compromised. To make this approach work, a few technical issues need to be addressed: (1) how to identify semantic inconsistency between injected pages and the main content of a domain; (2) how to control the false positives caused by the legitimate content including the terms, e.g., a health center sites on Stanford University (containing the irrelevant term "pharmacy"); (3) how to gather the search terms related to diverse promotional content. For the first issue, our approach starts with a small set of manually selected terms popular in illicit activities (e.g., gambling, drug and adult) and runs a word embedding based tool to calculate the semantic distance between these terms and a set of keywords extracted from the sTLD's search content, which describe the sTLD's semantics. Those most irrelevant are utilized for detection (Section III-B). To suppress false positives, our approach leverages the observation that similar promotional content always appear on many different pages under a compromised domain for the purpose of improving the rank of the attack website pointed to by the content. As a result, a search of the irrelevant term under the domain will yield a result page on which many highly frequent terms (such as "no prescription", "low price" in the promotional content) turn out to rarely occur across the generic content under the same domain (e.g., stanford.edu). This is very different from the situation, for example, when a research article mentions viagra, since the article will not be scattered across many pages under the site and tends to contain the terms also showing up in the generic content under the Stanford domain, such as "study", "finding", etc. (Section III-B). Finally, using the terms extracted from the result snippets of the sites detected, SEISE further automatically expands the list of the search terms for finding other attacks (Section III-C).

We implemented SEISE and evaluated its efficacy in our research (Section IV). Using 30 seed terms and 403 sTLDs (across 141 countries and 89 languages), our system automatically analyzed 100K FQDNs and along the way, expanded the keyword list to 597 terms. In the end, it reported 11K infected FQDNs, which have been confirmed to be compromised through random sampling and manual validation. With its low false detection rate (1.5%), SEISE also achieved over 90% detection rate.

Note that in line with the prior research, the term "compromise" here refers to not only direct intrusion of a web domain, which was found to be the most common cases in our research (80%, see Section VI), but also posting of illicit advertising content onto the domain through exploiting its weak (or lack of) input sanitization: e.g., blog/forum Spam and link Spam (using exposed server-side scripts to dynamically generate promotion pages under the legitimate domain).

Moving beyond sTLD, we further explore the potential extension of the technique to gTLDs such as .com (Section V-B). A preliminary design analyzes .com domains using their site tag labeled by SimilarSites, which is found to be pretty effective: achieving a false detection rate (FDR) of 9% when long keywords gathered from compromised sTLDs are used.

Our Findings.

Looking into the promotional infections detected by SEISE, we were surprised by what we found: for example, about 3% (175) of .gov domains and 3% (246) of .edu domains are injected; also around 2% of the 62,667 Chinese government domains (.gov.cn) are contaminated with ads, defacement content, Phishing, etc. Of particular interest is a huge gambling campaign we discovered (Section V-C), which covers about 800 sTLDs and 3000 gTLDs across 12 countries and regions (US, China, Taiwan, Hong Kong, Singapore and others). Among the victims are 20 US academia institutes such as nyu.edu, ucsd.edu, 5 government agencies like va.gov, makinghomeaffordable.gov, together with 188 Chinese universities and 510 Chinese government agencies. We even recovered the attack toolkit used in the campaign, which supports automatic site vulnerability scan, shell acquisition, SEO page generation, etc. Also under California government's domain ca.gov, over one thousand promotion pages were found, all pointing to the same online casino site. Another campaign involves 102 US universities (mit.edu, princeton.edu, stanford.edu, etc.), advertising "buy cheap essay". The scope of these attacks go beyond commercial advertising: we found that 12 Chinese government and university sites were vandalized with the content for promoting Falun Gong. Given the large number of compromised sites discovered, we first reported the most high-impact findings to related parties (particularly universities and government agencies) and will continue to do so (Section VI).

Further, our measurement study shows that some sTLDs such as .edu, .edu.cn and .gov.cn are less protected than the .com domains with similar Alexa ranks, and therefore become soft targets for promotional infections (Section V-B). By effectively detecting the attacks on these sTLDs, SEISE raises the bar for the adversary, who has to resort to less guarded gTLDs, which typically have much lower Alexa ranks, making the attacks, SEO in particular, less effective.

Contributions.

The contributions of the paper are outlined as follows:

Efficient semantics-based detection of promotional infections.

We developed a novel technique that exploits the semantic gap between domains (sTLDs in particular) and unauthorized content they host to detect the compromised websites that serve underground advertising. Our technique is highly effective, incurring low false positives and negatives. Also importantly, it is simple and efficient: often a compromised domain can be detected by querying Google no more than 3 times. This indicates that the technique can be easily scaled, with the help of search providers.

Measurement study and new findings.

We performed a large-scale measurement study on promotional infections, the first of this kind. Our research brings to light several high-impact, ongoing underground promotion campaigns, affecting leading educational institutions and government agencies, and the unique techniques the perpetrator employs. Further we demonstrate the impacts of our innovation, which significantly raises the bar to promotional infections and can potentially be extended to protect generic domains.

Roadmap.

The rest of the paper is organized as follows: Section II provides background information for our study; Section III elaborates on the design of SEISE; Section IV reports the implementation details and evaluation of our technique; Section V elaborates on our measurement study and new findings; Section VI discusses our current design and potential future research; Section VII reviews related prior research and Section VIII concludes the paper.

Background

In this section, we lay out the background information of our research, including the promotional infection, sTLD, NLP and the assumptions we made.

Promotional Infection.

As mentioned earlier, promotion infection is caused by exploiting the weakness of a website to advertise some content. A typical form of such an attack is black-hat SEO, a technique that improves the rank of certain content on the results page by taking advantage of the way search engines work, regardless of the guidelines they provide. Such activities can happen on a dedicated host, for example, through stuffing the pages with the popular search terms that may not be related to the advertised content, for the purpose of enhancing the chance for the user to find the pages. In other cases, the perpetrator compromises a high-rank website to post an ad pointing to the site hosting promoted content, in an attempt to utilize the compromised site's reputation to make the content more visible to the user. This can also be done when the site does not check the content uploaded there, such as visitors' comments, which causes its display of blog or forum Spam. Such SEO approaches, the direct compromise and the uploading of Spam ads, are considered to be promotional infections. Different from the SEO on a dedicated host, these approaches leverage a legitimate site and also provide their ad-related keywords to the search engine crawler, to attract targeted visitors.

The promotional infection can be used for multiple goals such as malware distribution, phishing, blackhat SEO or political agenda promotion. Black-hat SEO is often used to advertise counterfeit or unauthorized products. The same promotional tricks have also been played to get other malicious content to the audience at which the adversary aims. Prominent examples are Phishing websites that try to defraud the visitors of their private information (user names, passwords, credit-card numbers, etc.) and fake AV sites that cheat the user into downloading malware.

Sponsored Top-Level Domains.

A sponsored top-level domain (sTLD) is a specialized top-level domain that has private agencies or organizations as its sponsors that establish and enforce rules restricting the eligibility to use the domain based on community theme concepts. For example, .aero is sponsored by SITA, which limits registrations to members of the air-transport industry. Compared to unsponsored top-level domain (gTLD), an sTLD typically carries designated semantics from its sponsors. For example, as a sponsored TLD, .edu, which is sponsored by EDUCAUSE, indicates that the corresponding site is post-secondary institutions accredited by an agency recognized by the U.S. Depathnent of Education. Note that sTLDs for different countries are also associated with specific semantic meanings as stated in ICANN, e.g., edu.cn for Chinese education institutions.

In our research, we collected sTLDs for different countries according to the 10 categories provided by ICANN: . aero, .edu, .int, .jobs, .mil, .museum, .post, .gov, .travel, .xxx and the public suffix list maintained by the Mozilla Foundation. All together, we got 403 sTLDs from 141 countries.

Natural Language Processing.

The semantics information SEISE relies on is automatically extracted from web content using Natural Language Processing. Technical advances in the area have already made effective keyword identification and sentence processing a reality. Below, we briefly introduce the key NLP techniques used in our research.

> Word embedding (skip-gram model). A word embedding W: words→$V^N$ is a parameterized function mapping words to high-dimensional vectors (200 to 500 dimensions), e.g., W ('education')=(0.2, −0.4, 0.7, . . . ), to represent the word's relation with other words. Such a mapping can be done in different ways, e.g., using the continual bag-of-words model and the skip-gram technique to analyze the context in which the words show up. Such a vector representation ensures that synonyms are given similar vectors and antonyms are mapped to dissimilar vectors. Also interestingly, the vector representations fit well with our intuition about the semantic relations between words: e.g., the vectors for the words 'queen', 'king', 'man' and 'woman' have the following relation: $v_{queen} - v_{woman} + v_{man} \approx v_{king}$. In our research, we utilized the vectors to compare the semantics meanings of different words, by measuring the cosine distance between the vectors. For example, using Wikipedia pages as a training set (for the context of individual words), our approach automatically identified the words semantically-close to 'casino', such as 'gambling' (with a cosine distance 0.35), 'vegas' (0.46) and 'blackjack' (0.48).
> 
> Parts-of-speech (POS) tagging and phrase parsing. POS tagging is a procedure of labeling a word in the text (corpus) as corresponding to a particular part of speech as well as its context (such as nouns and verbs). POS tagging accepts the text as input and outputs the words labeling with POS such as noun, verb, adjective, etc. Phrase parsing is the technique to divide sentences into phrases that logically belong together. Phrase parsing accepts texts as input and outputs a series of phrases in the texts. The state-of-the-art POS tagging and phrase parsing techniques can achieve over 90% accuracy. POS tagging and phrase parsing can be used in the content term extraction, i.e., determining important terms within a given piece of text. Specifically, after parsing phrases from the given content, POS tagger helps to tag the terminological candidates, such as syntactically plausible terminological noun phrases. Then, the terminological candidates are further analyzed using statistical approaches (e.g., point-wise mutual information) to determine important terms.

Adversary Model.

In our research, we consider the adversary who tries to exploit legitimate websites for promoting unauthorized content. Examples of such content include unlicensed online pharmacies, fake AV, counterfeit, politics agenda or Phishing sites. For this purpose, the adversary could inject ads or other content into the target sites to boost the search rank of the content he promotes or use sTLD sites as redirectors to monetize traffic.

SEISE: Design

As mentioned earlier, promotional infections often do not propagate malicious payloads (e.g., malware) directly and instead only post ads or other content that legitimate websites may also contain. This makes detection of such attacks extremely difficult. In our research, we look at the problem from a unique perspective, the inconsistency between the malicious advertising content and the semantics of the website, particularly, what is associated with different sTLDs. More specifically, underlying SEISE are a suite of techniques that search sTLDs (.edu, .gov, etc.) using irrelevant bad terms (IBT) (the search terms unrelated to the sTLDs but heavily involved in malicious activities like Spam, Phishing) to find potentially infected FQDNs, analyze the context of the IBTs under those FQDNs to remove false positives and leverage detected infections to identify new search terms, automatically expanding the IBT list. Below we elaborate on this design.

A. Overview

Architecture.

FIG. 2 illustrates the architecture of SEISE 200, which includes Semantics Finder 202, Inconsistency Searcher 204, Context Analyzer 206 and IBT Collector 208. Semantics Finder 202 takes as its input a set of sTLDs, automatically identifying the keywords that represent their semantics. These keywords are compared with a seed set of IBTs to find the most irrelevant terms. Such selected terms are then utilized by Inconsistency Searcher 204 to search related sTLDs for the FQDNs carrying these terms. Under each detected FQDN, Context Analyzer 206 further evaluates the context of discovered IBTs through a differential analysis to determine whether after removing stop words, i.e., the most common words like 'the' from the context, frequently-used terms identified there (e.g., the search result of site:stanford.edu pharmacy) become rare across the generic content of the FQDN (e.g., the search result of site:stanford.edu), which indicates that the FQDN has indeed been compromised. Such FQDNs are reported by SEISE and their snippets are used by IBT Collector 208 to extract keywords. Those with the largest semantic distance from the sTLDs are added to the IBT list for detecting other infected FQDNs.

EXAMPLE

To explain how SEISE works, let us take a look at the example at the beginning of the paper (FIG. 1). For the sTLD .edu, SEISE first runs Semantics Finder 202 to automatically extract keywords to profile sTLD, e.g., "education", "United States" and "student". In the meantime, a seed set of IBTs, including "casino", "pharmacy" and others, are converted into vectors using the word-embedding technique. Their semantic gap with the .edu sTLD is measured by calculating the cosine distances between individual terms (like "pharmacy") and the sTLD keywords (such as "education", "United States" and "student"). It turns out that the terms like "pharmacy" are among the most irrelevant (i.e., with a large distance with .edu). It is then used to search Google under .edu, which shows the FQDN stanford.edu hosting the content with the search term. Under this FQDN, SEISE again searches for "pharmacy." The results page is presented in FIG. 1. As we can see, many search result items (for different URLs) contain same topic words, similar snippet and even URL patterns, which are typically caused by mass injection of unauthorized advertising materials. These items form the context for the IBT "pharmacy" in stanford.edu.

Our approach then converts the context (the result items) found into a high-dimensional vector, with the frequency of each word (except those common stop words like 'she', 'does', etc.) as an element of the vector. The vector, considered to be a representative of the context, then goes through a differential analysis: it is compared with the vector of a reference, the search results page of site:stanford.edu that describes the generic content under the FQDN. The purpose is to find out whether the context is compatible with the theme of the FQDN. If the distance between them is large, then we know that this FQDN hosts a large amount of similar text semantically incompatible with its theme (i.e., most of the high frequent words in the suspicious text, such as "viagra", rarely appear in the common content of the FQDN). Also given the fact that such text is the context for the search terms irrelevant to the sTLD of the current FQDN but popular in promotional infections, we conclude that the FQDN stanford.edu is indeed compromised.

Once an infection is detected, the terms extracted from the context of "pharmacy" are then analyzed and those most irrelevant to the semantics of .edu are added to the IBT list for finding other compromised FQDNs. Examples of the terms include "viagra", "cialis", and "tadalafil". In addition to the words, the URL pattern of the infection is then generalized to detect other advertising targets (e.g., red wine) not included in the initial IBT list (e.g., those for promoting illegal drugs). The same technique can also be applied to find out compromised gTLDs like the .com FQDNs involved in the same campaign.

B. Semantics-Based Detection

In this section, we present the technical details for Semantics Finder 202, Inconsistency Searcher 204 and Context Analyzer 206.

Finding Semantics for sTLDs.

The first step of our approach is to automatically build a semantic profile for an sTLD. Such a profile is represented as a set of terms, which serve as an input to the Inconsistency Searcher 204 for choosing right IBTs. For example, the semantic representation of the sTLD .edu.cn could be "Chinese university", "education", "business school", etc. SEISE automatically identifies these terms from different sources using a term extraction technique. Specifically, the following two sources are currently utilized by our prototype:

Wikipedia: the Wikipedia pages for sTLDs provide a comprehensive summary of different sTLDs. For example, https://en.wikipedia.org/wiki/ .mil profiles the sTLD .mil, including its sponsor ("DoD Information System Agency"), intended use ("military entities"), registration restrictions ("tightly restricted to eligible agencies"), etc. In our research, we ran a crawler that collected the wiki pages for 80 sTLDs.

Search results: the search results page for an sTLD query (e.g., site:gov) lists high-profile websites under the sTLD. As mentioned earlier, each search result includes a snippet of a website, which offers a concise but high-quality description of the website. Since the websites under the sTLD carry the semantic information of the sTLD, such descriptions can be used as another semantic source of the sTLD. Therefore, our approach collected the search result pages of all 403 sTLDs using automatically-generated queries in the form of "site: sTLD", such as site: edu. From each result page, top 100 search results are picked up for constructing the related sTLD's semantic profile.

From such sTLD semantics sources, the Semantics Finder 202 runs a content term extraction tool to automatically gather keywords from the sources. These keywords are supposed to best summarize the topic of each source and therefore represent the semantics of an sTLD. In our implementation, we utilized an open-source tool topia.termextract for this purpose. From each keyword extracted, our approach further calculates its frequency, which is assigned to the keyword as its weight. Altogether, top 20 keywords are chosen for each sTLD as its semantics profile.

A problem is that among all 403 sTLDs, 71 of them are non-English ones, which include Chinese, Russian, French, Arabic, etc., 89 languages altogether. Analyzing these sTLDs in their native languages is complicated, due to the challenges in processing these languages: for example, segmenting Chinese characters into words is known to be hard. To solve this problem, we utilized Google Translate to convert the search page of an non-English sTLD query into English and then extract their English keywords. The approach was found to work effectively, capturing non-English promotional infections (see Section V).

Searching for Inconsistency.

The Inconsistency Searcher 204 is designed to find out the IBTs with great semantic gaps with a given sTLD, and use the terms to search the sTLD for suspicious (potentially compromised) FQDNs. To this end, we first selected a small set of seed IBTs as an input to the system. These IBTs were collected from spam trigger word lists and SEO competitive word list, which are popular terms used in counterfeit medicine selling, online gambling and Phishing. From those terms, the most irrelevant ones are picked up for analyzing a given sTLD. Such terms are found by comparing them with the semantics profile of the FQDN, that is, the set of keywords output by the Semantics Finder 202.

Specifically, such a semantic comparison is performed by SEISE using a word-embedding tool called word2vec, a neural network that builds a vector representation for each term by learning from the context in which the term occurs. In our research, we utilized the English Wikipedia pages as the context for each term to compute its vector and measure the distance between two words using their vectors. In this way, the IBTs irrelevant to a given sTLD can be found and used to search under the FQDN for detecting the suspicious ones. The approach works as follows:

We downloaded all 30 GB Wikipedia pages and ran a program to preprocess those pages by removing tables and images while preserving their captions. Individual sentences on the pages were further tokenized into terms using a phrase parser.

Given an input term (an IBT or a keyword in the sTLD's semantics profile), our approach runs word2vec to train a skip-gram model, which maps the term into a high-dimensional vector (d1, d2, ... di, ... ) to describes the term's semantics. This vector is generated from all the sentences involving the term, with individual elements describing the term's relations with other terms in the same sentence across all such sentences in the Wikipedia dataset.

Given the vectors of an IBT and an sTLD keyword, our approach measures the semantic distance between them by calculating the cosine distance between their vectors. For each IBT, its average distance to all the keywords is used to determine its effectiveness in detecting promotional infections. In our research, we found that when the distance becomes 0.6 (at least 20 terms are still there within our seed set) or more, almost no compromised site is missing (see FIG. 5(a) in Section V). The IBTs selected according to such a threshold are then sent to the search engine together with the sTLD through the query site:sTLD+IBT (e.g.,site:edu casino). From the search result page, top 100 items (URLs) are further inspected by the Context Analyzer 206 to determine whether related FQDNs are indeed compromised, which is detailed in the followed subsection.

As an example, again, let us look at FIG. 3: in this case, the IBT "casino" has a distance of 0.72 with regard to the semantics of .edu and therefore was run under the sTLD; from the search pages, top FQDNs, including mysau3.arbor.edu, www.unlv.edu, were examined to detect compromised FQDNS.

Analyzing IBT Context.

As mentioned earlier, even the terms most irrelevant to an sTLD could show up on some of its pages for a legitimate reason. For example, the word 'casino' has a significant semantic distance with the sTLD .edu, which does not mean, however, that the .edu sites cannot carry a poster about one's travel to Las Vegas or a research article about a study on the gambling industry. Actually, a direct search of the term site:edu casino yields a result page with some of the items being legitimate. To identify those compromised FQDNs, the Context Analyzer 206 automatically examines the individual FQDN on the result page, using a differential analysis (FIG. 2) to detect those truly compromised.

More specifically, the differential analysis involves two independent queries, one on the suspicious FQDN together with the IBT (e.g., site:life.sunysb.edu casino) and the other on the FQDN alone (e.g., site:life.sunysb.edu) whose results page serves as the reference. The idea is based on the observation that in a promotional infection, the adversary has to post similar text on many different pages (sometimes pointing to the same site) for promoting similar products or content. This is necessary because the target site's rank needs multiple highly-ranked pages on the compromised site to promote. The problem for such an attack is that the irrelevant content, which is supposed to rarely appear under the FQDN, becomes anomalously homogenous and pervasive under a specific IBT. As a result, when we look at the search results of the IBT under the FQDN, their URLs and snippets tend to carry the words rarely showing up across the generic content (i.e., the reference) with much higher frequencies than their accidental occurrences under the FQDN. On the other hand, in the case of legitimate content including the IBT, the search results (for the IBT under the FQDN) will be much more diverse and the words involved in the IBT's context often appear on the reference and are compatible with the generic content of the site; even for the irrelevant terms in the context, their frequencies tend to be much lower than those in the malicious context. This is because it is unlikely that the term irrelevant to the theme of the site accidentally appears in similar context across many pages, which introduces an additional set of highly-frequent irrelevant terms. As an example, let us look at FIG. 3(a) that shows a compromised FQDN and FIG. 3(b) that illustrates a legitimate FQDN. The highly-frequent words extracted from the former under the IBT 'casino', such as 'bookmarkporlet', 'dealers', 'slot', never show up across the URLs and snippets of the reference that represents the generic content of the FQDN (the result of the query site:mysau3.arbor.edu). In contrast, a query of the legitimate FQDN using the same IBT yields a list of results whose URLs and snippets have highly diverse content, with some of their words also included in the generic content, such as 'class', 'education' and 'university', and most others (except the IBT itself) occurring infrequently.

To compare the two search result pages for identifying the truly compromised site, the Context Analyzer 206 picks up top 10 search results from each query and converts them into a high dimensional vector. Specifically, our approach focuses on the URL and the content snippet for each result item. We segment them into words using delimiters such as space, comma, dash, etc., and remove stop words (those extremely common words like 'she', 'do', etc.) using a stop word list. In this way, each search item is tokenized and the frequency of each token, across all 10 results is calculated to form a vector V=<$w_0$, $w_1$, ..., $w_i$, ... >, where $w_i$ is the frequency of a word corresponding to that position. For the two vectors $V_b$ (the search page under the IBT) and $V_g$ (the reference, that is, the search page of the FQND without the IBT), SEISE calculates their Cosine distance:

$$1 - \frac{V_b \cdot V_g}{\|V_b\| \, \|V_g\|}.$$

In FIG. 3(a), the distance of the vector for the IBT 'casino' with the reference vector is 0.97. In FIG. 3(b), where the FQDN is not compromised, we see that the vector under the IBT 'casino' is much closer to that of the reference, with a distance of 0.14. In our research, we chose 0.9 as a threshold to parameterize our system: whenever the Cosine distance between the results of querying an FQDN under an IBT and the reference of the FQDN goes above the threshold, the Context Analyzer 206 flags it as infected. This approach turns out to be very effective, incurring almost no false positives, as elaborated in Section IV.

Discussion.

SEISE is carefully designed to work on search result pages instead of the full content of individual FQDNs. This is important because the design helps achieve not only high performance but also high accuracy. Specifically, a semantic analysis on a small amount of context information (title, URL and snippet of a search result) is certainly much more lightweight than that on the content of each web page. Also interestingly, focusing on such context helps avoid the noise introduced by the generic page content, since the snippet of each search result is exactly the text surrounding an IBT, the part of the web page most useful for analyzing the suspicious content it contains. In other words, our approach leverages the search engine to zoom in on the context of the IBT, ignoring unrelated content on the same web page.

C. IBT SET Extension

A critical issue for the semantic-based detection is how to obtain high-quality IBTs. Those terms need to be malicious and irrelevant to the semantics of an sTLD. Also importantly, they should be diverse, covering not only different keywords the adversary may use in a specific category of promotional infections, like unlicensed pharmacy, but also those associated with the promotional activities in different categories, such as gambling, fake product advertising, academic cheating, etc. Such diversity is essential for the detection coverage SEISE is capable of achieving, since a specific type of promotional attack (e.g., fake medicine) cannot be captured by a wrong IBT (e.g., 'gambling').

As mentioned earlier, the seed IBT set used in our research includes 30 terms, which were collected from several sources, including spam trigger word lists and SEO competitive word list. These IBTs are associated with the attacks such as blackhat SEO, fake AV and Phishing. To increase the diversity of the set, SEISE expands it in a largely automated way, both within one category and across different categories. More specifically, our approach leverages NLP techniques to gather new IBTs from the search items reported to contain malicious content, and further cluster these IBTs to discover new categories. Here we elaborate on this design.

Finding IBTs Within a Category.

Once a compromised FQDN has been identified using an IBT, the search results that lead to the detection (for the query "site:FQDN+IBT") can then be used to find more terms within the IBT's category. This is because the result items are the context of the IBT, and therefore include other bad terms related to the IBT. Specifically, similar to the Semantics Finder 202, the IBT Collector 208 runs the term extraction tool on each result item, including its title, URL and snippet, to gather the terms deemed important to the context of the IBT. Such terms are further inspected, automatically, against the semantics of an sTLD by measuring their average distances with the keywords of the FQDN (that is, converting each of them into a vector using word2vec and then calculating the Cosine distance between two vectors). Those sufficiently away from the FQDN's semantics (with a distance above the aforementioned threshold) are selected as IBTs.

Finding New Categories.

Extracting keywords from the context of an IBT can only provide us with new terms in the same category. To detect the infections in other categories, we have to extend the IBT set to include the terms in other types of illicit promotions. The question is how to capture new keywords such as 'prescription-free antibiotic' that are distinguished from the IBTs in the known category such as 'gambling', 'casino', etc. A key observation we leveraged in our study is that the adversary sometimes compromises an FQDN to perform multiple types of advertising: depending on the search terms the user enters, an infected website may provide different kinds of promotional content, for drug, alcohol, gambling and others. Further the ads serving such a purpose are often deposited under the same directory, along the same path under a compromised FQDN. This enables us to exploit the URL included in a contaminated result item (as detected by SEISE) to find the promotional materials unrelated to the context of the IBT in use.

Specifically, from each flagged FQDN, the IBT Collector 208 first picks up all the URLs leading to malicious content, and from them, identifies the most commonly shared path under the FQDN. For example, from the URLs www.lgma.ca.gov/play/popular/1*.html, www.lgma.ca.gov/play/home/2*.html and www.lgma.ca.gov/play/club/3*.html (detected using the IBT 'casino'), the shared path under the FQDN is www.lgma.ca.gov/play. Using this path, our approach queries Google again with 'site:FQDN+path': e.g., site:www.lgma.ca.gov/play. From the results page of the query, critical terms are extracted by analyzing snippets under individual result items. These terms are further compared with the semantics of the current sTLD: those most irrelevant (with a cosine distance above the threshold 0.9) are kept. Finally, the vectors of these terms are clustered using the classic k-Nearest-Neighbor (k-NN) algorithm (with k=10) together with all existing IBTs. Once a new cluster is formed in this way, we manually look at the cluster and label it with its semantics (gambling, drug selling, academic cheating, etc.). Note that this manual step is just for labeling, not for adjusting the clustering outcomes, which were found to be very accurate in our research (Section IV-C).

In the above example as illustrated in FIG. 4, the query site: www.lgma.ca.gov/play leads to the search results page. From the items on the page, the IBT Collector 208 automatically recovers a set of critical terms, including 'goldslot', 'payday loan', 'cheap essay' and others. Clustering these terms, some of them are classified into existing categories such as gambling, drug, etc., while the rest are grouped into a new cluster, containing 'cheap essay', 'free term paper' along with other 15 terms. This new cluster is found to be indeed a new attack category, and labeled as 'academia cheating'. In our research, we ran the approach to extend our IBT set, from 30 terms to 597 effective terms, from 3 categories (gambling, drug, etc.) to 10 large categories (financial, cheating, politics, etc.). Our manual validation shows that the results are mostly correct.

Implementation and Evaluation

In this section, we report our implementation of SEISE and evaluation of its efficacy. Our study show that the simple semantics-based approach works well in practice: it automatically discovered IBTs, achieved an low false detection rate (1.5%) at over 90% of coverage and also captured 75% infected domains never reported before (Section IV-C).

A. Implementing SEISE

The design of SEISE (Section III) was implemented into a prototype system, on top of a set of building blocks. Here we briefly describe these nuts and bolts and then show how they are assembled into the system.

Nuts and Bolts.

Our prototype system was built upon three key functional components, term extractor, static crawler and semantic comparator. Those components are extensively reused across the whole system, as illustrated in FIG. 2. They were implemented as follows:

Term extractor accepts text as its input, from which it automatically identifies critical terms. The component was implemented in Python using an open-source tool topia.termextract.

Static crawler accepts query terms, looks for the terms through search engines and returns results with a predetermined number of items. In our implementation, the crawler was developed in Python and utilized the Google Web Search API and the Bing Search API to get search results.

Semantic comparator accepts a set of terms and compares them with the keywords of an input sTLD. It can return the average distance of each term with those keywords or the terms whose distances are above a given threshold. This component was implemented as a Python program that integrates the open-source tool word2vec.

As mentioned earlier, we trained the language model used by word2vec with the whole Wikipedia dataset, from which our implementation automatically collected the context for each term before converting it to a high-dimensional vector.

System Building.

Using these building blocks, we constructed the whole system as illustrated in FIG. 2. Specifically, the Semantic Finder was developed to run the static crawler to gather the content under an sTLD and then call the term extractor to identify the keywords for the domain. The Inconsistency Searcher 204 invokes the semantic comparator to determine the most irrelevant IBTs before using the crawler to search for the terms. The Context Analyzer 206 includes a differential analyzer component implemented with around 300 lines of Python code. For each suspicious FQDN, the analyzer calls the crawler to query the search engine twice, one under an IBT and the other for getting the reference (the generic content). It reports the domain considered to be compromised. Finally, the IBT Collector 208 uses the crawler to search for the selected URL path under the detected domain, then the extractor to get critical terms from the search results and the semantics comparator to find out new IBTs. Over these IBTs, we further integrated the k-NN module provided by the scikit-learn open source machine learning library to cluster them and discover new bad-term categories.

B. Experiment Setting

Data Collection.

To evaluate SEISE, we ran our prototype on three datasets: the labeled bad set and good set, and the unknown set including 100K FQDNs collected from search engines, using 597 search terms, as explicated below.

Bad set. We collected the FQDNs confirmed to have promotional infections from CleanMX, a blacklist of compromised URLs. A problem here is that these URLs are associated with different kinds of malicious activities and it is less clear whether they are promotional infection. What we did is to collect all the sTLD URLs from the CleanMX feed from 2015/07 to 2015/08, and further manually inspected all these URLs. Specifically, whenever we saw that advertising, Phishing, defacement content showing up in the search results of a URL, it is considered to be exploited for promotional infections. We further classified these URLs into different categories and also manually identified related IBTs. In this way, we built a bad set with 300 FQDNs (together with 15 IBTs in three categories).

Good set. Using the IBTs collected from the bad set, we further searched under the sTLDs for the FQDNs ("site:sTLD+ IBT") that contained those terms but were not compromised. These domains were used to understand the false detections that could be introduced by SEISE. Altogether, we collected a good set of 300 FQDNs related to 15 IBTs and three categories.

Unknown set. As mentioned in Section II, we gathered 403 sTLDs and manually selected 30 IBTs in three categories. Running these IBT seeds on these sTLDs, we crawled Google and Bing over three months, collecting 100K FQDNs. This dataset was used as the unknown set for discovering new promotional infections.

Resources and validation.

In all our experiments, our proto-type system was run within Amazon EC2 C4.8xlarge instances equipped with Intel Xeon ES-2666 36 vCPU and 60 GiB of memory. To collect the data for the unknown set, we deployed 20 crawlers within virtual machines with different IP settings. These crawlers utilized the APIs provided by Google and Bing to dump the outcomes of the queries, from 2015/08 to 2015/10.

To validate the findings made on the unknown set, we employed a methodology that combined anti-virus (AV) scanning, blacklist checking and manual analysis. Specifically, for the FQDN reported by our system, we first scanned their URLs with VirusTotal and considered that the URLs were indeed suspicious when at least two scanners flagged the domain. Then, all such suspicious URLs were cross-checked against the blacklist of CleanMX. For those confirmed by both VirusTotal and CleanMX, their FQDNs were automatically labeled as compromised. For other domains also detected by SEISE, we randomly sampled 20% of them and manually checked whether they were indeed compromised.

C. Evaluation Results

Over the aforementioned datasets, we thoroughly evaluated our prototype. Our study shows that SEISE is highly effective: it achieved near zero False Detection Rate (FDR, i.e., FP/(FP+TP)) and over 90% coverage (i.e., TP/(TP+FN)) or below 4.7% FDR, 4.4% False Positive Rate (FPR, i.e., FP/(FP+TN)) and nearly 100% coverage on the labeled sets (the bad and good set); with the threshold chosen to balance FDR and FPR, we further ran SEISE over the unknown set, which reported over 11K compromised sites, with an FDR of 1.5% and a coverage over 90%. Also importantly, 75% of infections discovered from the unknown set are likely never reported before, including 3 large-scale campaigns, on which we elaborate in Section V. All these findings were made in a highly efficient and scalable way: on average, only 2.3 queries were made for finding a new compromised FQDN and the delay caused by analyzing the query results and other computing resources consumed for this purpose were completely negligible.

Accuracy and Coverage.

Figure 5:
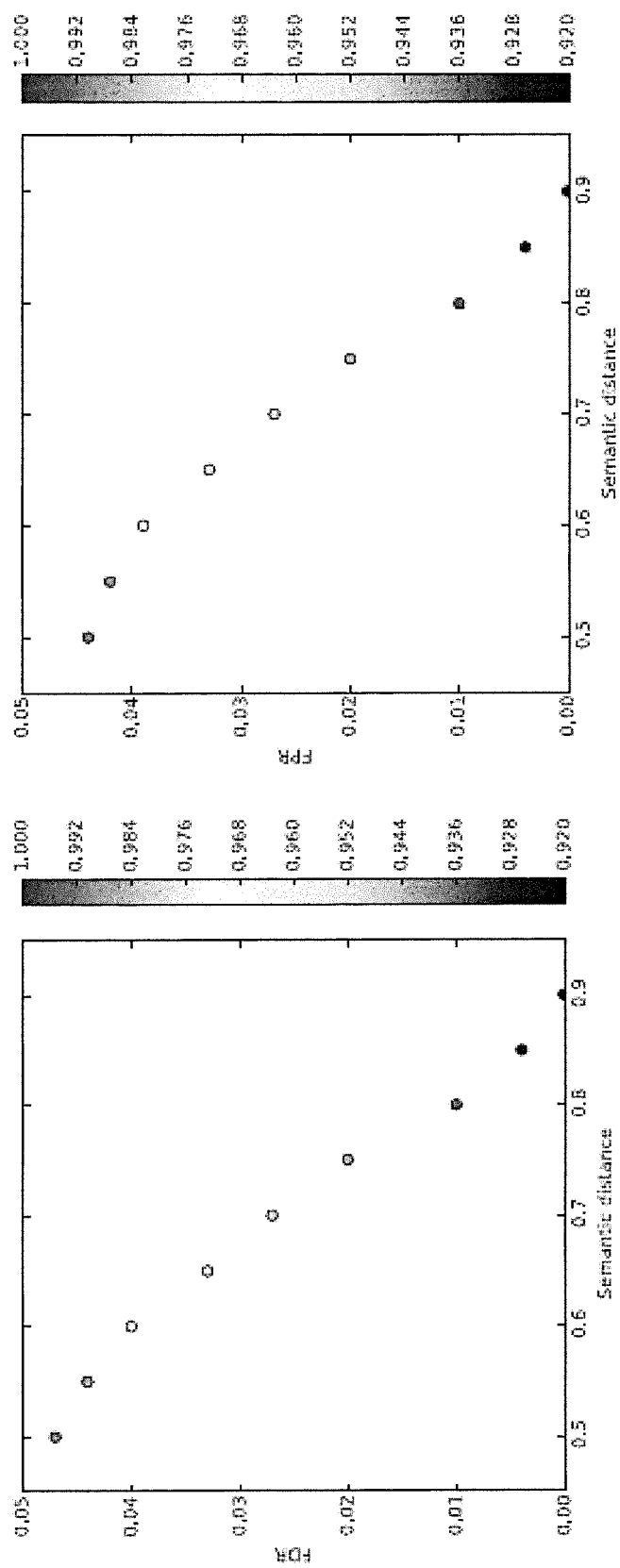
FIGS. 5A-5B illustrate an exemplary graphical presentation of evaluation results.

We evaluated the accuracy and the coverage of SEISE under a given set of IBTs. In this case, what can be achieved are all dependent on the Context Analyzer 206, which ultimately decides whether to flag an FQDN as compromised. In our research, we first studied our system over the labeled good set and bad set, and then put it to test over the unknown set. FIGS. 5(a) and 5(b) illustrate the results over the labeled sets, in response to different thresholds for semantic distances (between the reference and the query of an IBT). As we can see here, when the threshold goes up, the FDR goes down and so does the coverage. On the other hand, loosening the threshold, which means that the IBT is becoming less irrelevant to the semantics of the sTLD, improves the coverage, at the cost of the FDR. Overall, the results show that SEISE is highly accurate: by setting the threshold to 0.9, we observe almost no false detection (FDR: 0.5% and FPR: 0.4%) with a 92% of coverage; alternatively, if we can tolerate 4.7% FDR (FPR: 4.4%), the coverage becomes close to 100%. In our research, the threshold 0.9 was then utilized to analyze the unknown set.

On the unknown set, we ran SEISE to query 597 IBTs under 403 sTLDs. Our prototype inspected 100K FQDNs in total. 11,473 of them were flagged as compromised, about 11% of the whole unknown set. Table II and Table III summarize our findings, which are further discussed in Section V. Among all that were detected, 3% were confirmed by both VirusTotal and CleanMX, 22% were found by at least one of these two AV systems and further validated manually, and 1000 of the remaining were inspected manually. Altogether, the FDR measured from the unknown set is as low as 1.5%. We further randomly sampled 500 result pages related to 10 categories of IBTs and found that our prototype reported 53 infections and missed 5, which indicates a coverage of about 90%. Also, note that over 75% of the infections have never been reported (missed by both VirusTotal and CleanMX). We have reported the most prominent ones among them to related organizations and are helping them fix the problem, and will continue to work on other cases.

IBT Expansion.

The effectiveness of SEISE also relies on its capability to discover new IBTs and find new attack instances across different categories. As discussed before, our prototype starts with a small set of seed IBTs, 30 terms in three categories. After searching for all these terms under all the sTLDs, a set of compromised FQDNs are detected, which are further used by the IBT Collector 208 to extract new terms for searching all 403 sTLDs again. In our research, we repeated such iteration 20 times, expanding the IBT set to 597 terms and 10 categories. All the terms and categories were manually confirmed to be correct. Table I presents the numbers for the terms and the categories, together with examples of new terms detected, after the 1st, 5th, 10th, 15th and 20th iterations. As we can see here, the number of categories and number of IBTs increase quickly (with an increase rate of 60% and 180%, respectively) in the first 10 iterations, which indicate that our IBT expansion method is efficient for both in-category and cross-category expansion. Also, Table III illustrates the total categories of IBTs flagged by SEISE after these iterations.

TABLE I

Number of IBTs in each round.

| Round | # of categories | # of IBTs per category | Avg. length |
|-------|-----------------|------------------------|-------------|
| 0     | 3               | 10                     | 2.6         |
| 5     | 5               | 18                     | 3.0         |
| 10    | 8               | 25                     | 3.1         |
| 15    | 10              | 40                     | 3.2         |
| 20    | 10              | 60                     | 3.8         |

TABLE II

Top 10 sTLDs with most injected domains.

| sTLD   | Est. total | # monitored | # injected | Volume | Injected size           |
|--------|------------|-------------|------------|--------|-------------------------|
| gov.cn | 62,667     | 2,904       | 1,240      | 12%    | FQDN: 1,840 URL: 172,244 |
| edu.vn | 16,148     | 2,032       | 262        | 3%     | FQDN: 312 URL: 22,543   |
| edu    | 8,955      | 2,502       | 246        | 3%     | FQDN: 250 URL: 29,580   |
| edu.cn | 3,912      | 1,173       | 238        | 2%     | FQDN: 403 URL: 34,308   |
| edu.au | 9,594      | 1,968       | 204        | 2%     | FQDN: 223 URL: 21,563   |
| gov.co | —          | 1,892       | 200        | 2%     | FQDN: 253 URL: 23,022   |
| gov    | 6,251      | 1,562       | 175        | 2%     | FQDN: 178 URL: 15,720   |
| gov.in | 4,272      | 1,402       | 141        | 1%     | FQDN: 163 URL: 14,572   |
| edu.in | 3,892      | 1,243       | 132        | 1%     | FQDN: 172 URL: 12,034   |
| edu.mx | 8,232      | 1,372       | 126        | 1%     | FQDN: 144 URL: 11,056   |

TABLE III

Categories of IBTs.

| Category | # kw. | avg. len | Keyword example | # FQDN | # domains | Injected site Example |
|----------|-------|----------|-----------------|--------|-----------|----------------------|
| Gambling | 62    | 3.5      | casino, slot machine | 3650 | 2134 | ca.gov (Alexa: 649) |
| Drug     | 64    | 3.2      | cheap xanax, no prescription | 2047 | 1742 | princeton.edu (Alexa: 3558) |
| General  | 83    | 3.4      | nike air max, green coffee bean | 1673 | 1572 | nth.gov (Alexa: 196) |
| Cheating | 52    | 4.2      | fake driving permit, cheap essay | 1107 | 1017 | mit.edu (Alexa: 789) |
| Financial | 65   | 3.6      | payday loan, quick loan | 1092 | 947 | nxf.gov (Alexa: 16,303) |
| Travel   | 58    | 4.5      | cheap airfare, hotel deal | 972 | 924 | gmu.edu (Alexa: 8058) |
| Luxury   | 59    | 3.2      | cheap gucci, discounted channel | 890 | 876 | nv.gov (Alexa: 25,875) |
| Adult    | 60    | 4.6      | qvod, sex movie | 922 | 843 | tsinghua.edu.cn (Alexa: 6717) |
| Software | 53    | 5.2      | free download, system app | 807 | 734 | noad.gov (Alexa: 1126) |
| Politics | 41    | 3.2      | islamic state, falun gong | 372 | 342 | buaa.edu.cn (Alexa: 33,807) |

| Domain | Alexa Rank | IBT |
|--------|------------|-----|
| nih.gov | 196 | General |
| ca.gov | 649 | Gambling |
| state.gov | 719 | Drug |
| mit.edu | 789 | Drug |
| harvard.edu | 1034 | Cheating |
| weather.gov | 1035 | Software |
| stanford.edu | 1050 | Drug |
| noaa.gov | 1126 | Software |
| psu.edu | 1342 | Drug |
| berkeley.edu | 1452 | Drug |
| purdue.edu | 1462 | Drug |
| cdc.gov | 1731 | Drug |
| umich.edu | 1781 | Drug |

TABLE III-continued

| Categories of IBTs. | | |
|---|---|---|
| cornell.edu | 1806 | Drug |
| ed.gov | 1816 | Drug |
| washington.edu | 1905 | Drug |
| sp.gov.br | 1986 | Drug |
| ucla.edu | 1989 | General |
| utexas.edu | 2012 | Financial |
| wisc.edu | 2199 | General |

Performance.

We further evaluated the performance of our prototype, in an attempt to understand the scalability of our design. We found that except the delay caused by receiving the results from Google, the overhead for analyzing search results and detecting compromised sites are exceedingly low: by running 10000 randomly selected queries (50 IBTs over 200 sTLDs), we observed that the average time for analyzing 1K result items, excluding the waiting time for the search engine, was 1ms, and also the memory and CPU usages stayed below 5% respectively. The main hurdle here is the delay caused by the search engine: for Google, it ranged from 5ms to 8ms per one thousand queries. The design of SEISE already limits the number of queries that needed to be made for detecting infected FQDNs: in the experiments, we found that on average, a compromised FQDN was detected after 2.3 term queries. We believe that by working with the search provider (Google, Bing etc.), SEISE can be easily scaled with a quick turnaround of the search results.

Measurement

Based upon what was detected by SEISE, we performed a measurement study to understand the promotional infections on sTLDs, particularly the semantic inconsistency these attacks introduce. Our study brings to light the pervasiveness of the attacks and their significant impacts, affecting the websites of leading academic institutions and government agencies around the world. Further discovered are a set of surprising findings and their insights, which have never been known before. For example, apparently sTLDs are soft targets for promotional infections, highly ranked and also easier to compromise compared with gTLD sites of similar ranks; as a result, by mitigating the threats to the sTLD domains, we raise the bar for the adversary, depriving him of easy access to the resources highly valuable to the promotional attacks, which rely on the compromised site's rank to boost the rating of malicious content. As another example, we show that semantic inconsistency can also be observed in the promotional infections on gTLDs such as .com, .net, etc., even though these domains tend to have a much more diverse semantic meaning Based upon this observation, a preliminary exploration highlights the potential of extending our approach to protect gTLD sites, indicating that a semantic model can also be built for some websites under the gTLD domains to capture the promotional attacks on them. Finally, we elaborate on a study on some prominent attack cases discovered in our research, which, from the semantic perspectives, analyzes the techniques the adversary employ in the promotional infections.

A. Landscape

Scope and Magnitude.

Our study reveals that the promotional infections are spread across the world, compromising websites in all kinds of sTLDs. Altogether, SEISE detected around 1 million URLs leading to malicious content on 11,473 infected FQDNs under 9,734 sTLD domains. The results are summarized in Table II and Table III.

To understand the magnitude of the threat towards individual sTLDs, we studied the ratio of compromised FQDNs under each domain category. For this purpose, we first tried to get some idea about how many FQDNs are under each sTLD, using the passive DNS dataset from DNSDB. The dataset includes the records of individual DNS RRsets as well as first-seen, last-seen timestamps for each domain and the DNS bailiwick from Farsight Security's Security Information Exchange and the authoritative DNS data. The number of FQDNs under an sTLD was estimated from those under the sTLD queried between 2014/01 and 2015/08, as reported by the passive DNS records. The results were further cross-validated by comparing them with the estimated domain counts given by DomainTools for each TLD.

Table II illustrates the top-10 sTLD with the largest number of infected domains, together with the number of domains we monitored and the total number of domains we estimated for each sTLD. According to our findings, gov.cn is the least protected sTLD with a significant portion of the FQDNs compromised (12%), which is followed by edu.vn 3% and edu.cn 3%. The top-3 sponsoring registrars with the most infected gov.cn sites are sfn.cn, alibaba.com, xinnet com. On the other hand, .mil sites apparently are better protected than others. Among the 456 .mil domains we monitored, only 8 domains are injected.

Figure 7:
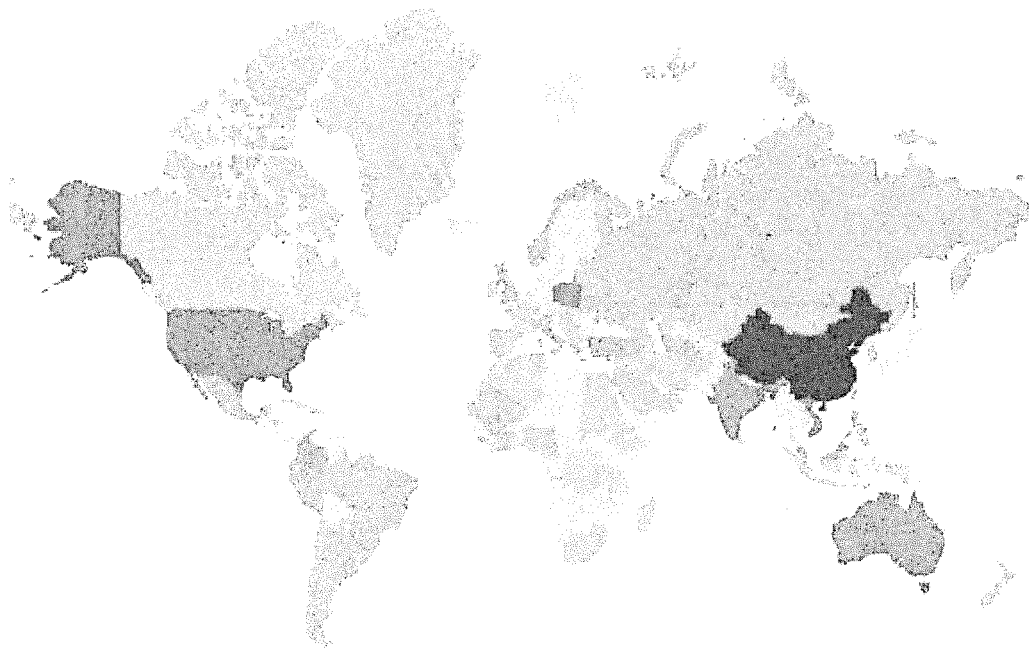
FIG. 7 is an exemplary visualization of geolocation distributions of the compromised sTLD sites across 141 countries.

FIG. 7 describes the distributions of the compromised sTLD sites across 141 countries, as determined by their geolocation. Based upon the number of infected domains, countries are colored with different shades of blue. As we can see here, most of infected sites are found in China (15%), followed by United States (6%) and Poland (5%).

Impacts of the Infections.

Figure 6:
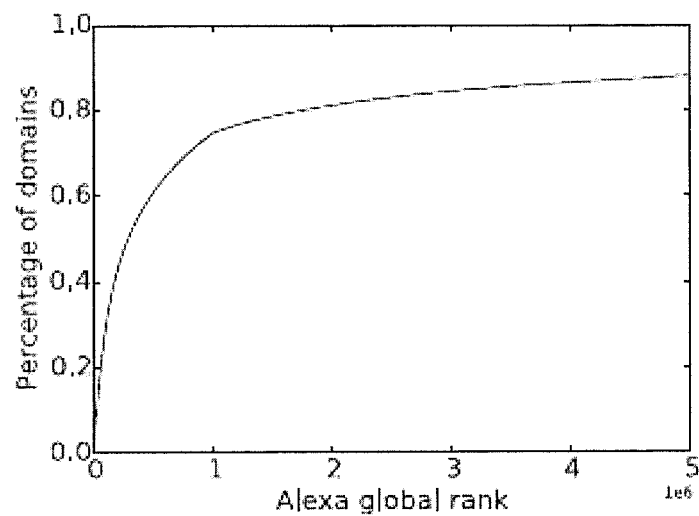
FIG. 6 is an exemplary graphical presentation of cumulative distribution of injected sTLD sites' Alexa rank and Top 20 injected sTLD sites with highest Alexa rank.

We further looked into the Alexa ranks of injected sTLD websites, which are presented in FIG. 6. Across different sTLDs, highly ranked websites were found to be exploited, getting involved in various types of malicious activities, SEO, Phishing, fake drug selling, academic cheating, etc. FIG. 6 illustrates the cumulative distributions of the ranks: a significant portion of the infections (75%) actually happen to those among the top 1M. FIG. 6 further shows the top-20 websites with the highest Alexa ranks. Among them, 12 are under .edu, including the websites of leading institutions like mit.edu (Alexa:789), harvard.edu (Alexa:1034), stanford.edu (Alexa:1050) and berkeley.edu (Alexa:1452), and 7 under .gov, such as nih.gov (Alexa:196), state.gov (Alexa:719) and noaa.gov (Alexa:1126). In general, China is the country that hosts most injected sTLD sites; however, when it comes to top ranked sites (Alexa rank<10K), 67% of them are in the United States and Australia.

Also interesting is the types of malicious activities in which those domains are involved. Table III shows the number of the domains utilized for promoting each type of content (across all 10 categories). As we can see here, most of the injected sTLD sites (19%) are in the Gambling category, which is followed by those related to Drug (15%) and General Product (14%) such as shoes and healthcare products. When we look at the top-20 domains, many of them are infected to promote Drug. Also, many .edu domains advertise unlicensed pharmacy, while .gov are mainly compromised to promote gambling and fake AV. Interestingly, the injected domains associated with different countries tend to serve different types of content. For example, the most common promotions on Chinese domains are gambling (which is illegal in that country), while most injected US domains are linked to unlicensed online pharmacy. Since the infected country code sTLDs (e.g., .cn) can make the content they promote more visible to the audience in related countries (e.g., boosting the ranks of malicious sites in the results of country-related searches), it is likely that promotional infections target specific groups of Internet users, just like legitimate advertising.

Figure 8:
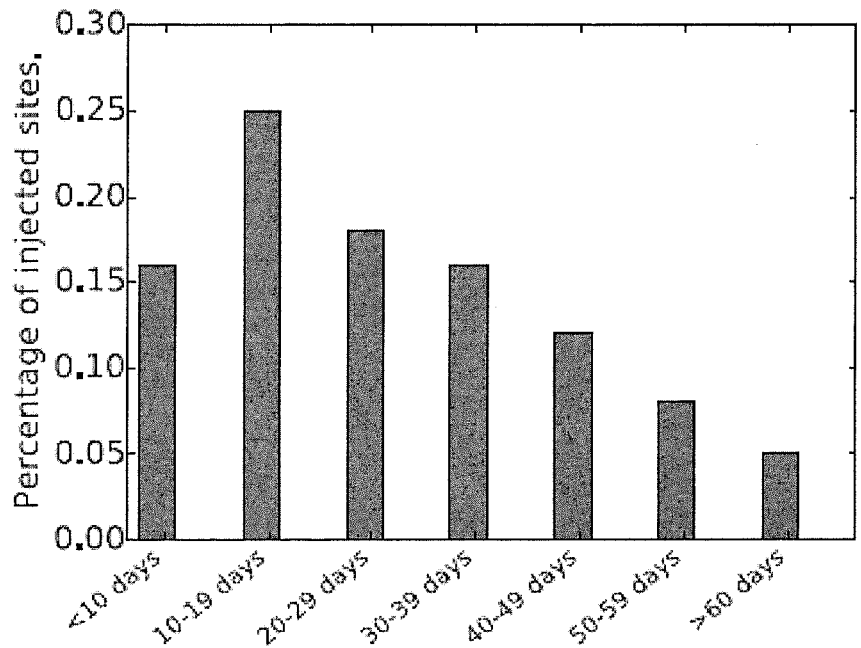
FIG. 8 is an exemplary graphical representation of distribution of the infection time.

Our study further shows that many of such infections have been there for a while. FIG. 8 shows the distribution of the infection time for the injected page in sTLD sites. We estimated the durations of their infections by continuously crawling the 20K injected pages (which were detected in 2015/08) every two days from 2015/08 to 2015/11 to find out whether they were still alive. As we can see from the figure, most infections last 10-20 days, while some of them have indeed been there for a while, at least 1 months. A prominent example is the injection on ca.gov, whose infection starts no later than 60 days.

B. Implications of Semantics Inconsistency

Our study shows that promotional infections, particularly for those under sTLDs, are characterized by the inconsistency between the semantics of the promoted content and that of an infected domain's generic content: in our labeled bad set (the collection of compromised domains reported by CleanMX; see Section IV-B), all sTLD-related infections contain the malicious content inconsistent with the semantics of their hosting websites. The implication of this observation is that by exploiting this feature, a weakness of the sTLD-based promotional infections, a semantic-based approach, like SEISE, can effectively suppress such a threat to sTLDs. This is significant, since our study, as elaborated below, shows that sTLDs are valuable to the adversary because they are less protected and highly ranked. Further, even for gTLDs, which tends to have highly diverse and less specified semantics, the malicious content uploaded there also tends to be incompatible with the compromised websites' themes. This indicates that our approach can be applied beyond sTLDs. Following we report our findings.

sTLD as a Soft Target.

To understand the importance of sTLDs to the adversary, we compared the compromised sTLD sites with those under the gTLDs, within the same attack campaign. A campaign here includes a set of websites infected for promoting unauthorized or malicious content and those sites share a set of common features, specifically, they all pointing to the same target site being advertised, their malicious URLs having the same features (such as same affiliate ID as URL parameter) and they all share the same redirection chain. In our research, we discovered a campaign through infected websites' "link-farm" structure, i.e., a compromised site pointing to another one. Following the links on the compromised sTLD sites enabled us to reach a set of infected gTLD sites, mainly under .com. We then compared the features of those sites with those of sTLD domains, in terms of Alexa rank, pagerank (PR) and lifetime, in an attempt to find out what type of TLD domains are more valuable to promotional infections.

Figure 9A:
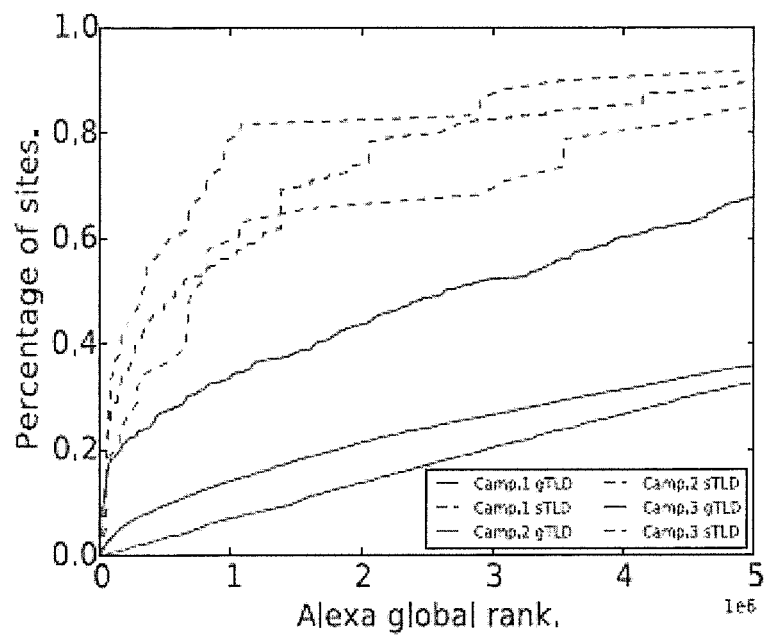
Figure 9B:
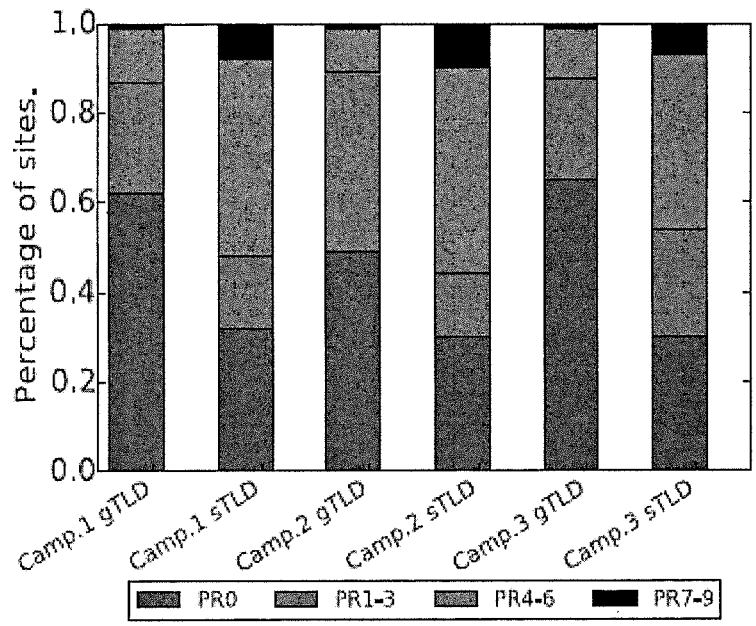

Table IV presents the top-3 campaigns (all organized as link farms) discovered in our study. The largest one covers about 872 sTLDs and 3426 gTLDs across 12 countries and regions (US, China, Taiwan, Hong Kong, Singapore and others). Among the victims are 20 US academic institution such as nyu.edu, ucsd. edu, 5 government agencies like va.gov, makinghomeaffordable.gov, together with 188 Chinese universities and 510 Chinese government agencies. Also among the victims are 1507 .com sites. FIG. 9(a) and FIG. 9(b) compare the Alexa global ranks and the page rank (PR) of those gTLD and sTLD websites. As we can see from the figures, 50%-75% of sTLD sites are ranked within the Alexa top 1M, while only 10%-30% of gTLD sites are at this level. Actually, more than 40% of the gTLD sites have Alexa rank outside the top 5M. By comparison, less than 20% of sTLDs have ranks outside the top 5M. In terms of PR, more than 30% of the sTLD sites have PR from 4 to 6, while less than 5% of gTLD sites are PR4-PR6. Also, more than half of gTLD sites have PR as 0, which have a weaker SEO effectiveness than those with high PR. This indicates that the majority of sTLD sites have a stronger effect on the promoted sites than gTLD sites with no or low PR.

TABLE IV

Top 3 link-farm campaigns with most injected sTLD domains.

| Name | # sTLD domains | # gTLD domains | # countries | Promotion Content |
|---|---|---|---|---|
| Campaign 1 | 872 | 3,426 | 12 | Gambling |
| Campaign 2 | 148 | 5,210 | 7 | Cheating |
| Campaign 3 | 60 | 5,198 | 15 | Drug |

Figure 9C:
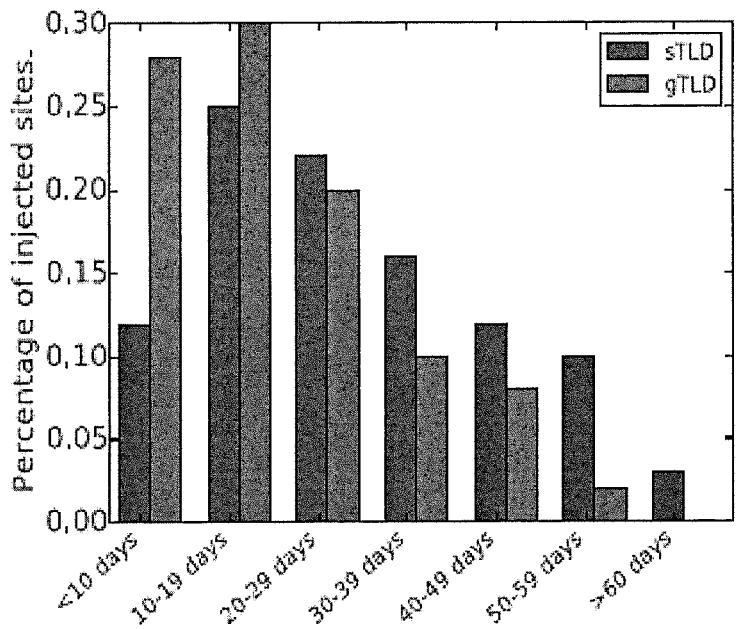

We further compared the durations of the infections for these two types of domains. Again, we continuously crawled the compromised pages (identified in 2015/08-2015/09) every two days from 2015/09 to 2015/11 to check whether the infections were still there. FIG. 9(c) illustrates the distributions of the sTLD site's life spans and those of gTLD sites. As can be seen from the figure, gTLD sites were cleaned up more quickly than the sTLD sites. Over 25% of the gTLD sites were cleaned within 10 days, while 12% of the sTLD sites were cleaned within 10 days.

Our study demonstrates that the sTLDs are ranked higher than the gTLD sites and much more effective in elevating the ranks of promoted content, thereby more valuable to promotional infections. In the meantime, they are less protected than the gTLDs: once compromised, the infections will stay there for a longer period of time. This indicates that, indeed, the sTLDs are valuable assets to the adversary and effective protection of the site, as SEISE does, indeed makes the promotional attacks less effective.

Extension to gTLDs.

Compared with sTLDs, gTLDs (e.g., .com, .net and .org) do not have fixed semantic meanings. However, we found that still the malicious content injected here tends to be incompatible with the semantics of the sites, which can be captured by the search engine results. FIG. 10 presents an example of search engine results for an injected gTLD site iceriversprings.com, which is the website of Ice River Green brand of bottled water. However, the injected page show the semantically inconsistent content for "payday loan" promotion.

Then, we measure the semantics inconsistency on the 3,000 gTLD sites, which are randomly sampled from the aforementioned campaigns. Specifically, we use the Context Analyzer 206 component in SEISE to calculate the semantic distance between the generic content of those known injected sites (the reference, e.g., the search result of the query site:iceriversprings.com) and the results of querying IBTs on these sites, which mostly contain injected malicious content (e.g., site:iceriversprings.com "payday loan"). However, we also found that some compromised gTLD sites show semantic consistent with the promotional content. For example, online drug library druglibrary.org (in Campaign 3) was injected to promoted "cheap xanax". Hence, to identify those suspicious sites (before they are checked with the Context Analyzer 206), we utilized the similarsites website query API to fetch the site tags (e.g., "recycling" and "water" for site:iceriversprings.com) to determine a gTLD site's semantics, and only use the gTLD sites showing semantic inconsistency with the IBT (i.e., the site's tags semantically distance away from the IBT) as the suspicious candidates for the input of the Context Analyzer 206. This filtering step (for the purpose of increasing the "toxicity level" of the inputs) is built as the Semantic comparator, which accepts the threshold for the IBT semantics distance (Section III-B) and outputs the candidate gTLD sites that have great semantic distances with the IBT used for the query. For example, iceriversprings.com, which has the site tag "recycling", "water" which shows semantic inconsistency (determined by Semantic comparator FIG. 2) with the IBT "payday loan", will be regarded as suspicious FQDNs and become the input of the Context Analyzer 206.

FIG. 9(d) shows the semantic distances between the reference and the search results of querying an IBT with and without the Semantic comparator. We observe that the Context Analyzer 206 can still identify the semantics inconsistency, particularly with the help of the Semantic comparator that selects sites with great semantic distances with the IBT: 97% of the injected sites have semantic distance larger than 0 8 when the threshold of Semantic comparator is set to 0.9; by comparison, 85% of the injected sites have semantic distance larger than 0 8 in the absence of the Semantic comparator.

Further, we measure the semantic inconsistency of unknown injected gTLD sites. This is nontrivial because simply searching site:.com "payday loan" will return mostly legitimate search results. Even though we could validate these FQDNs one by one through the Semantic comparator and the Context Analyzer 206, the cost for finding truly compromised sites becomes overwhelming As mentioned earlier, with a similar PR, gTLD sites are better protected than sTLD sites. Hence, when searching gTLDs under the IBT (e.g., site:.com "payday loan"), high-PR gTLD sites tend to appear on top of the search results, which are actually less likely to be compromised. For example, when searching "payday loan", many high-PR sites such as checkintocash-.com, wikipedia.org and www.acecashexpress.com will show up within the top-100 search results. None of them appear to be compromised. To address this challenge and identify the sites likely to be compromised (which will be further determined by the Context Analyzer 206), we utilized long IBTs (word length larger than 4) to feed search engine to obtain suspicious FQDNs. Generally, longer query keywords have less search competition, i.e., websites with lower PRs are more likely to appear in the search results. For example, when searching for "payday loan no credit check" under .com, bottled water website iceriversprings.com and ATM company website carolinaatm.com are within the top-10 search results.

In our experiments, we utilized 1000 long IBTs in 10 individual categories to do the search, and 23,098 gTLD FQDNs were collected for the semantic inconsistency analysis. We set the threshold of the Context Analyzer 206 to 0.9, and 7,430 of the gTLD FQDNs were reported to have promotional infections. We further randomly sampled 400 results (200 injected and 200 not-injected) and manually checked the findings. We confirmed that 182 were indeed infections and 196 were not injected, which gives us an FDR of 9% and FPR of 8.4%. With this encouraging outcome, how to detect compromised gTLDs through semantics-based approaches remains to be an open question. Particularly, new techniques need to be developed to further suppress FDR and improve its coverage. Also, query terms for detection should also be automatically discovered.

C. Case Studies

Perhaps the most surprising findings of our study is the discovery of several large-scale attacks, infecting many leading organizations around the world. In addition to the afore-mentioned gambling campaign, we also found the infections for promoting counterfeit products, fake essays and political materials on university and government sites. Here we present the studies on two cases as examples to provide additional information about what techniques the adversary uses and how the attacks are organized.

Exploit Kit Discovered.

We found an exploit toolkit used in multiple gambling campaigns, for example, Campaign 1. The toolkit, called xise, was discovered on a cloud drive. By analyzing its code, we found that xise has the functionalities for automatic site collection, shell acquisition, customized injected page generation and a series of evasion techniques such as redirection cloaking and code obfuscation. More specifically, it automatically discovers the domains of high-profile websites from Google and other search engines, and also scans the websites for the vulnerabilities within the components such as phpmyadmin, kindeditor, ueditor, alipay and fckeditor. Further, it lets its user provide the promoted site's URL and keywords and automatically generates the pages to be injected to the compromised websites along a specific path (e.g., filemanager/browser/default/images/icons). The tool also uploads a configuration file to the compromised web server to perform redirection cloaking: i.e., it will redirect visitors based on their HTTP referrers to protect the compromised site. Also, to guarantee the malicious content to be indexed by search engines, xise also uploads scripts to keep generating pages to guarantee SEO effectiveness. Note that adding and changes is a freshness factor for high search engine ranking In our research, we manually generated signatures for xise as listed in Table V. 1037 of sTLD sites we detected are related to xise with the average semantics distance 0.87 to it sTLDs.

TABLE V

Example of signatures.
Signature

<!--google!-->...<!--googlee-->
<img width="20" height="20" border="0" hspace="0" vspace="0" src="http://count51.51yes.com/count1.gif">
<!--ZJEG_RSS.content.begin-->...<!--ZJEG_RSS.content.end-->
<iframe marginwidth="0" marginheight="0" hspace="0" vspace="0" frameborder="0" scrolling="no" src="" height="0" width="0">

Academic Cheating Infections.

Our research also discovered many infections promoting academic cheating sites. Those sites provide online services for preparing any kind of homework at the high school and college levels, and even taking online tests for students. We found that such attacks mainly aim at .edu domains and the examples of the IBTs involved include 'free essay', 'cheap term paper' and others. These terms were found to be very effective at finding such malicious activities. SEISE detected 428 compromised sites, including high-profile .edu domains such as mit.edu, princeton.edu, havard.edu, etc.

Table VI compares the compromised .edu sites in different keyword categories. We observe that such malicious activities have apparently already become a global industry. 119 education TLDs in 109 countries have 428 infected domains to promote academic cheating sites. The Top 3 education TLDs with most infected sites are edu (23%), edu.mn (11%) and edu.cn (7%).

TABLE VI

Comparison of injected education TLDs sites in different keyword categories.

| Category | # FQDN | # domains | Performance (term query per site) |
|---|---|---|---|
| Academic cheating | 470 | 428 | 2.2 |
| Gambling | 589 | 367 | 2.8 |
| Drug | 423 | 360 | 2.5 |
| Financial | 401 | 327 | 3 |
| Adult | 260 | 214 | 3.2 |

Discussion

Our research shows that semantics-inconsistency search offers a highly-effective solution to the promotional-infection threat. In this section, we discuss the tricks the adversary can play to evade our detection, our technique and future research, together with the lesson learnt from our study and our communication with the victims.

Evasion.

The current implementation of SEISE is based upon the search results returned from Google and Bing. While both are mainstream search engines targeted by promotional infections, the data we crawled are limited to the sites that indexed by Google and Bing. Hence, to evade SEISE, the adversary, who has full control of a compromised website, may set robots.txt to prevent part of its content from being scanned. Such evasion techniques, however, will cause the promotion pages to lose the visitors from the search engines and also the high-profile links to the sites being promoted. This defeats the purpose of the promotional infections, which are meant to advertise malicious content through the search engines and therefore should aggressively expose its content (promotional pages) to the search engines, instead of hiding it from them. Other issues related to search results include the delay introduced by page indexing and page expiration. Again, although our approach is not designed to capture a promotional infection before it is indexed by the search engines, the impact of the infection is also limited at that time, simply because its whole purpose is to advertise some malicious materials, which is not well served without the infected pages being discovered by the search engine. For page expiration, we need to consider the fact that as long as the URLs of the promoted content are still alive, the attack is still in effect, since letting people find the URLs is the very purpose of the attack. Whether the URLs are still there can be confirmed by crawling the links. Further, the snippet of the search results, even for the pages that are already expired, can still be utilized to find new keywords.

The adversary may play other evasion tricks, by adding more relevant keywords to the infected page to make the content look more consistent with the website's theme, or hiding the inconsistent content by embedding it within images. However, even in the presence of relevant content, the malicious keywords can still be recovered and cause an observable semantic deviation from the theme of the original website, as long as the keywords are sufficiently frequent to be picked up by the search engine and contribute to the change of the malicious content's rank in search results. Hiding content in images results in neglect of malicious content in the search results, which is not what the adversary wants. Fundamentally, no matter what the adversary does, the fact remains that any attempt to cover the content being advertised will inevitably undermine the effectiveness of the promotional effort. Another evasion strategy is to just compromise the website with compatible semantics. This approach will significantly limit the attack targets the adversary can have. Particularly, it is less clear how this can be done for sTLDs. Note that even selling medicine on a health institution's site can be captured, as the infections of the NIH pages shown at the beginning of the paper.

Lesson Learned.

Our study shows that sTLD sites are often under-protected. Particularly for universities and other research institutions, their IT infrastructures tend to be open and loosely controlled. As a prominent example, in a university, individual servers are often protected at the department levels while the university-level IT often only takes care of network-level protection (e.g., intrusion detection). The problem is that, oftentimes, the hosts are administrated by less experienced people and include outdated and vulnerable software, while given the nature of the promotional infections, they are less conspicuous in the network traffic, compared with other intrusions (e.g., setting up a campus bot net). We believe that SEISE, particularly its Context Analyzer 206, can play the role of helping the web administrators of these organizations detect the problems with those less-protected hosts. Of course, a more fundamental solution is to have a better centralized control, at least in terms of discovering the security risks at the host level and urging the administrators of these hosts to keep their software up-to-date.

Responsible Disclosure.

Since the discovery of infected domains, we have been in active communication with the parties affected. So far, we have reported over 120 FQDNs to CERT in US and 136 FQDNs to CCERT (responsible for .edu.cn) in China, the two countries hosting most infected domains. By now, CCERT have confirmed our report, and notified all related organizations, in which 27 responded and fixed their problems. However, it is difficult for us to directly contact the victims to get more details (like log access) from the infected servers. On the other hand, given the scale of the attacks we discovered, the whole reporting process will take time.

Related Work

Detection of Injected Sites.

How to detect injection of malicious content has been studied for long. Techniques have been developed to analyze web content, redirection chains and URL pattern. Examples of the content-based detection include a DOM-based clustering systems for monitoring Scam websites, and a system monitoring the evolution of web content, called Delta, which keeps track of the content and structure modifications across different versions of a website, and identifies an infection using signatures generated from such modifications. More recently, Soska et al. works on detecting new attack trends instead of the attacks themselves. Their proposed system leverages the features from web traffic, file system and page content, and is able to predict whether currently benign websites will be compromised in the near future. Borgolte et al. introduces Meerkat, a computer vision approach to website defacement detection. The technique is capable of identifying malicious content changes from screenshots of the website. Other studies focus on malicious redirectors and attack infrastructures. Examples include JsRED that uses a differential analysis to automatically detect malicious redirect scripts, and Shady Path that captures a malicious web page by looking at its redirection graph. Compared with those techniques, our approach is different in that it automatically analyzes the semantics of web content and looks for its inconsistency with the theme of the hosting website. We believe that the semantics-based approach is the most effective solution to promotional infections, which can be easily detected by checking the semantics of infected sites but hard to identify by just looking at the syntactic elements of the sites: e.g., both legitimate and malicious ads can appear on a website, using the same techniques like redirections, iframe, etc. Further, we do not look into web content or infrastructure at all, and instead, leverage the search results to detect infections. Our study shows that this treatment is sufficient for finding promotional infections and much more efficient than content and infrastructure-based approaches.

Similar to our work, Evilseed also uses search results for malicious website detection. However, the approach is only based upon searching the URL patterns extracted from the malicious links and never touches the semantics of search results. Our study shows that focusing only on the syntactic features such as URL patterns is insufficient for accurate detection of promotional infections. Indeed, Evilseed reports a huge false detection rate, above 90%, and can only serve as a pre-filtering system. On the other hand, our technique inspects all the snippet of search results (not just URLs), automatically discovering and analyzing their semantics. This turns out to be much more effective when it comes to malicious promotional content: SEISE achieves low FDR (1.5%) at a detection coverage over 90%.

Study on Blackhat SEO.

Among the malicious activities performed by a promotional infection is blackhat SEO (also referred to webspam), which has also been intensively studied. For instance, Wang et al. investigated the longitudinal operations of SEO campaigns by infiltrating an SEO botnet. Leontiadis et al. conducted a long-term study using 5 million search results covering nearly 4 years to investigate the evolution of search engine poisoning. Also, Wang et al. examined the effectiveness of the interventions against the SEO abuse for counterfeit luxury goods. Moore et al. studied the trending terms used in search-engine manipulation. Also, Leontiadis et al. observed .edu sites that were compromised for search redirection attack in illicit online prescription drug trade, and briefly discussed their lifetime and volume. In our paper, we conduct a more comprehensive measurement on 403 sTLD, and multiple illicit practices beside drug trade were involved.

CONCLUSION

Here we report our study on promotional infections, which introduce a large semantic gap between the infected sTLD and the illicit promotional content injected. Exploiting this gap, our semantic-based approach, SEISE, utilizes NLP techniques to automatically choose IBTs and analyze search result pages to find those truly compromised. Our study shows that SEISE introduces low false detection rate (about 1.5%) with over 90% coverage. It is also capable of automatically expanding its IBT list to not only include new terms but also terms from new IBT categories. Running on 100K FQDNs, SEISE automatically detects 11K infected FQDN, which brings to light the significant impact of the promotional infections: among those infected are the domains belonging to leading educational institutions, government agencies, even the military, with 3% of .edu and .gov, and over one thousand domains of .gov.cn falling prey to illicit advertising campaigns. Our research further demonstrates the importance of sTLDs to the adversary and the bar our technique raises for the attacks. Moving forward, we believe that there is a great potential to extend the technique for protecting gTLDs, as indicated by our preliminary study. Further, we are exploring the possibility to provide a public service for detecting such infections.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A system having at least one processor configured to execute at least one computer-executable instruction for detecting an infected website, comprising:
a semantic finder configured to receive a set of top-level domains and identify a plurality of keywords of the set of top-level domains representing a predetermined semantics through a search of one or more sources of information relating to the set of top-level domains, the plurality of keywords representing the predetermined semantics being compared with a seed set of irrelevant bad terms to find at least one irrelevant term;

an inconsistency searcher configured to search the set of top-level domains and detect at least one fully-qualified domain name carrying the at least one irrelevant term;

a context analyzer configured to evaluate context information associated with the at least one irrelevant term, identify at least one frequently-used term identified in the context information, and determine whether the at least one frequently-used term is unrelated to a generic content of the at least one fully-qualified domain name; and an irrelevant bad term collector configured to extract the at least one frequently-used term unrelated to the generic content and add the extracted at least one frequently-used term to an irrelevant bad term list for detecting the infected website.

2. The system of claim 1, wherein the semantic finder is further configured to calculate a semantic distance between the plurality of keywords of the set of top-level domains and the seed set of irrelevant bad terms.

3. The system of claim 2, wherein the sematic finder is further configured to calculate the semantic distance based on a cosine distance between the plurality of keywords of the set of top-level domains and the seed set of irrelevant bad terms.

4. The system of claim 2, wherein the inconsistency searcher is further configured to detect the at least one fully-qualified domain name carrying the at least one irrelevant term based on the semantic distance.

5. The system of claim 1, wherein the context analyzer is further configured to convert the context information into a dimensional vector having a frequency of each keyword of the plurality of keywords representing the predetermined semantics.

6. The system of claim 1, wherein the context analyzer is further configured to evaluate the context information associated with the at least one irrelevant term using a differential analysis.

7. The system of claim 1, wherein the context analyzer is further configured to determine whether the context information is compatible with a theme of the at least one fully-qualified domain name based on a semantic distance between the plurality of keywords of the set of top-level domains and the seed set of irrelevant bad terms.

8. The system of claim 1, wherein the irrelevant bad term collector is further configured to detect the infected website based on the irrelevant bad term list.

9. The system of claim 1, wherein the irrelevant bad term collector is further configured to detect an additional infected website based on an URL pattern of the infected website.

10. The system of claim 1, wherein the irrelevant bad term collector is further configured to add the extracted at least one frequently-used term having a largest semantic distance from the set of top-level domains to the irrelevant bad term list.

11. A method of detecting an infected website using at least one processor configured to execute at least one computer-executable instruction, the method comprising:

receiving, using a semantic finder, a set of top-level domains and identifying a plurality of keywords of the set of top-level domains representing a predetermined semantics, the plurality of keywords representing the predetermined semantics being compared with a seed set of irrelevant bad terms to find at least one irrelevant term, and wherein the keywords are identified through a search of one or more sources of information relating to the set of top-level domains;

searching, using an inconsistency searcher, the set of top-level domains and detecting at least one fully-qualified domain name carrying the at least one irrelevant term;

evaluating, using a context analyzer, context information associated with the at least one irrelevant term, identifying at least one frequently-used term identified in the context information, and determining whether the at least one frequently-used term is unrelated to a generic content of the at least one fully-qualified domain name; and extracting, using an irrelevant bad term collector, the at least one frequently-used term unrelated to the generic content and add the extracted at least one frequently-used term to an irrelevant bad term list for detecting the infected website.

12. The method of claim 11, further comprising, calculating, using the semantic finder, a semantic distance between the plurality of keywords of the set of top-level domains and the seed set of irrelevant bad terms.

13. The method of claim 12, further comprising, calculating, using the sematic finder, the semantic distance based on a cosine distance between the plurality of keywords of the set of top-level domains and the seed set of irrelevant bad terms.

14. The method of claim 12, further comprising, detecting, using the inconsistency searcher, the at least one fully-qualified domain name carrying the at least one irrelevant term based on the semantic distance.

15. The method of claim 11, further comprising, converting, using the context analyzer, the context information into a dimensional vector having a frequency of each keyword of the plurality of keywords representing the predetermined semantics.

16. The method of claim 11, further comprising, evaluating, using the context analyzer, the context information associated with the at least one irrelevant term using a differential analysis.

17. The method of claim 11, further comprising, determining, using the context analyzer, whether the context information is compatible with a theme of the at least one fully-qualified domain name based on a semantic distance between the plurality of keywords of the set of top-level domains and the seed set of irrelevant bad terms.

18. The method of claim 11, further comprising, detecting, using the irrelevant bad term collector, the infected website based on the irrelevant bad term list.

19. The method of claim 11, further comprising, detecting, using the irrelevant bad term collector, an additional infected website based on an URL pattern of the infected website.

20. The method of claim 11, further comprising, adding, using the irrelevant bad term collector, the extracted at least one frequently-used term having a largest semantic distance from the set of top-level domains to the irrelevant bad term list.

* * * * *